United States Patent
Manahan et al.

(10) Patent No.: US 10,443,832 B2
(45) Date of Patent: Oct. 15, 2019

(54) COLLARS FOR LIGHT FIXTURES

(71) Applicant: Cooper Technologies Company, Houston, TX (US)

(72) Inventors: Joseph Michael Manahan, Manlius, NY (US); Andrew Francis Scarlata, West Monroe, NY (US); Daniel Robert Treible, Jr., Liverpool, NY (US); James E. Crocker, Jamesville, NY (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 0 days.

(21) Appl. No.: 15/830,317

(22) Filed: Dec. 4, 2017

(65) Prior Publication Data

US 2018/0156438 A1 Jun. 7, 2018

Related U.S. Application Data

(60) Provisional application No. 62/429,580, filed on Dec. 2, 2016.

(51) Int. Cl.
*F21V 21/00* (2006.01)
*F21V 25/12* (2006.01)
(Continued)

(52) U.S. Cl.
CPC ............... *F21V 25/12* (2013.01); *F21V 5/04* (2013.01); *F21V 15/01* (2013.01); *F21V 17/02* (2013.01);
(Continued)

(58) Field of Classification Search
CPC .................................. F21V 1/143; F21V 17/00
(Continued)

(56) References Cited

U.S. PATENT DOCUMENTS 5,578,905 A 11/1996 Graber
5,890,797 A 4/1999 Bish
(Continued)

FOREIGN PATENT DOCUMENTS

CN 201443739 4/2010
CN 201954375 8/2011
(Continued)

OTHER PUBLICATIONS

I. Istomin, International Search Report and Written Opinion issued in application No. PCT/US2017/064438, completion date Mar. 13, 2018, dated Mar. 22, 2018, 8 pages, Federal Institute of Industrial Property, Moscow, Russia.
(Continued)

*Primary Examiner* — Daniel St Cyr
(74) *Attorney, Agent, or Firm* — King & Spalding LLP

(57) ABSTRACT

A light fixture can include a housing having at least one wall and a collar limiting feature disposed at a top end of the at least one wall. The light fixture can also include a collar disposed around the at least one wall, where the collar abuts against the collar limiting feature and is rotatable relative to the housing, where the collar includes a first cover coupling feature. The light fixture can further include a cover coupled to the collar, where the cover includes a first collar coupling feature, where the first collar coupling feature couples to the first cover coupling feature of the collar. The housing can be rotatable relative to the collar and the cover when the cover is decoupled from the collar, where the housing can be held in a fixed position relative to the collar and the cover when the cover is coupled to the collar.

20 Claims, 16 Drawing Sheets

(51) Int. Cl.

| | | |
|---|---|---|
| *F21V 5/04* | (2006.01) | |
| *H01Q 1/42* | (2006.01) | |
| *H01Q 19/06* | (2006.01) | |
| *F21V 29/77* | (2015.01) | |
| *F21V 29/83* | (2015.01) | |
| *F21V 15/01* | (2006.01) | |
| *F21V 17/02* | (2006.01) | |
| *F21V 17/10* | (2006.01) | |
| *F21V 23/06* | (2006.01) | |
| *G01V 8/12* | (2006.01) | |
| *H05B 37/02* | (2006.01) | |
| *F21V 19/00* | (2006.01) | |
| *H01Q 1/00* | (2006.01) | |
| *H05B 33/08* | (2006.01) | |
| *F21V 3/00* | (2015.01) | |
| *F21V 31/00* | (2006.01) | |
| *F21V 23/04* | (2006.01) | |
| *F21Y 115/10* | (2016.01) | |

(52) U.S. Cl.
CPC ........ *F21V 17/107* (2013.01); *F21V 19/0015* (2013.01); *F21V 23/06* (2013.01); *F21V 29/77* (2015.01); *F21V 29/773* (2015.01); *F21V 29/83* (2015.01); *G01V 8/12* (2013.01); *H01Q 1/002* (2013.01); *H01Q 1/42* (2013.01); *H01Q 19/06* (2013.01); *H05B 33/0845* (2013.01); *H05B 37/0218* (2013.01); *H05B 37/0227* (2013.01); *H05B 37/0245* (2013.01); *H05B 37/0272* (2013.01); *H05B 37/0281* (2013.01); *F21V 3/00* (2013.01); *F21V 23/0471* (2013.01); *F21V 31/005* (2013.01); *F21Y 2115/10* (2016.08)

(58) Field of Classification Search
USPC .................................. 362/362, 365, 374, 375
See application file for complete search history.

(56) References Cited

U.S. PATENT DOCUMENTS

| | | | |
|---|---|---|---|
| 6,034,325 | A | 3/2000 | Nattel et al. |
| D592,799 | S | 5/2009 | Scott |
| 7,648,373 | B2 | 1/2010 | Dixon et al. |
| 7,741,782 | B2 | 6/2010 | Vermeulen et al. |
| D639,500 | S | 6/2011 | Choi et al. |
| 7,965,336 | B2 | 6/2011 | Bingle et al. |
| D646,016 | S | 9/2011 | Choi et al. |
| D656,262 | S | 3/2012 | Yoshinobu et al. |
| D656,263 | S | 3/2012 | Ogawa et al. |
| 8,232,909 | B2 | 7/2012 | Kroeger et al. |
| D672,480 | S | 12/2012 | Maxik et al. |
| 8,322,897 | B2 | 12/2012 | Blincoe et al. |
| D684,286 | S | 6/2013 | Rashidi |
| D699,889 | S | 2/2014 | Yasuji Fletcher et al. |
| 8,657,626 | B2 | 2/2014 | Duval et al. |
| D700,991 | S | 3/2014 | Johnson et al. |
| 9,404,624 | B2 | 8/2016 | Chung |
| 9,442,215 | B2 | 9/2016 | Kovacs et al. |
| D776,836 | S | 1/2017 | Tang |
| 9,626,847 | B2 | 4/2017 | Spiro |
| D802,197 | S | 11/2017 | Ding et al. |
| D803,427 | S | 11/2017 | Germain |
| D809,176 | S | 1/2018 | Partington |
| D822,859 | S | 7/2018 | Wang et al. |
| 10,260,722 | B2 | 4/2019 | Treible, Jr. et al. |
| 2004/0183744 | A1 | 9/2004 | Raiman |
| 2005/0183344 | A1 | 8/2005 | Ziobro et al. |
| 2008/0062705 | A1 | 3/2008 | Czech et al. |
| 2009/0081963 | A1 | 3/2009 | Boren |
| 2010/0270933 | A1 | 10/2010 | Chemel et al. |
| 2011/0194280 | A1 | 8/2011 | Ruffin, Jr. et al. |
| 2012/0206050 | A1 | 8/2012 | Spero |
| 2012/0040606 | A1 | 11/2012 | Veifuerth |
| 2012/0274208 | A1 | 11/2012 | Chen et al. |
| 2013/0021808 | A1 | 1/2013 | Harbers et al. |
| 2013/0200807 | A1 | 8/2013 | Mohan et al. |
| 2013/0314921 | A1 | 11/2013 | Chen |
| 2014/0085912 | A1 | 3/2014 | David et al. |
| 2015/0285480 | A1 | 10/2015 | Chien et al. |
| 2015/0338074 | A1 | 11/2015 | Chen et al. |
| 2015/0351195 | A1 | 12/2015 | Sargent et al. |
| 2016/0356474 | A1 | 12/2016 | Jayawardena |
| 2017/0079121 | A1 | 3/2017 | Jayawardena et al. |
| 2017/0156189 | A1 | 6/2017 | Jayawardena et al. |
| 2017/0184659 | A1 | 6/2017 | Jayawardena et al. |

FOREIGN PATENT DOCUMENTS

| | | |
|---|---|---|
| CN | 202432348 | 9/2012 |
| WO | 2013111134 | 8/2013 |
| WO | 2016176455 | 11/2016 |

OTHER PUBLICATIONS

S. Surikov, International Search Report and Written Opinion issued in application No. PCT/US2017/064443, completion date Apr. 28, 2018, dated May 10, 2018, 7 pages, Federal Institute of Industrial Property, Moscow, Russia.

Translation of CN202432348 via Lexis Nexis Total Patents, Jun. 6, 2018, 6 pages.

Translation of CN201954375 via Lexis Nexis Total Patents, Jun. 6, 2018, 4 pages.

Translation of CN201443739 via Lexis Nexis Total Patents, Jun. 6, 2018, 6 pages.

V. Surikov, International Search Report and Written Opinion issued in application No. PCT/US2017/054961, completion date Jan. 15, 2018, dated Jan. 18, 2018, 8 pages, Federal Institute of Industrial Property, Moscow, Russia.

S. Surikov, International Search Report and Written Opinion issued in application No. PCT/US2017/054957, completion date Dec. 25, 2017, dated Jan. 25, 2018, 9 pages, Federal Institute of Industrial Property, Moscow, Russia.

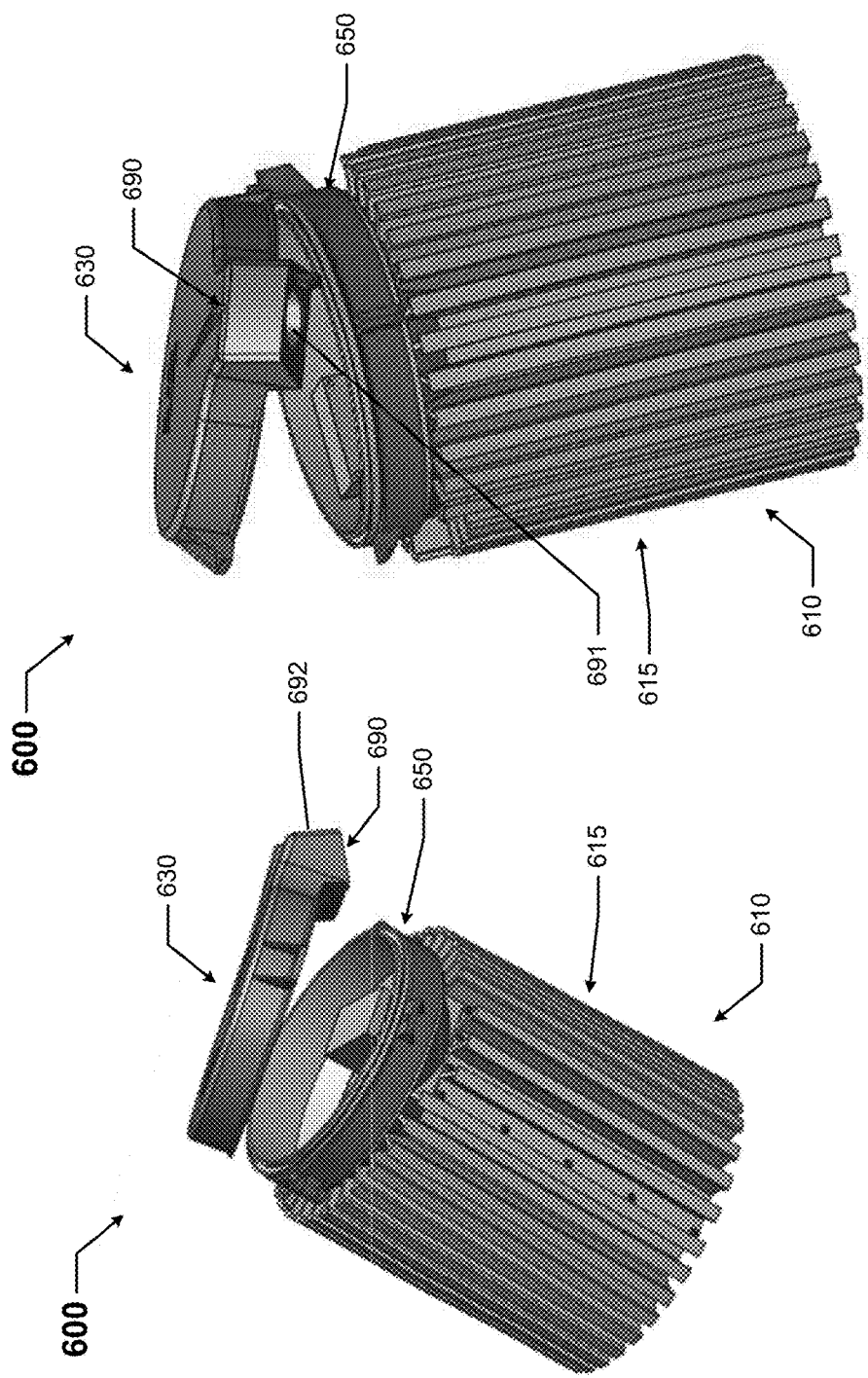

COLLARS FOR LIGHT FIXTURES

CROSS-REFERENCE TO RELATED APPLICATIONS

This application claims priority under 35 U.S.C. § 119 to U.S. Provisional Patent Application Ser. No. 62/429,580, titled "Hazardous Location Light Fixtures" and filed on Dec. 2, 2016. This application is also related to U.S. Provisional Patent Application Ser. No. 62/271,762, titled "Prognostic and Health Monitoring Systems For Light Fixtures" and filed on Dec. 28, 2015. The entire contents of these aforementioned applications are hereby incorporated herein by reference.

TECHNICAL FIELD

The present disclosure relates generally to light fixtures located in hazardous environments, and more particularly to systems, methods, and devices for collars for light fixtures.

BACKGROUND

Light fixtures are used in a variety of environments. Many of these light fixtures use advanced technology with a number of components. As a result, these light fixtures can have a number of failure points. In lighting applications, such as hazardous environments, reliability of the lighting system is vital. Unfortunately, the characteristics (e.g., humidity, extreme temperatures, corrosive gas) of these environments can cause the failure of one or more components of a light fixture to be accelerated. Further, the health and safety of a person located in such an environment can be at risk, with or without the person's knowledge. When a light fixture is placed in certain environments, such as a hazardous environment, some of these components of a light fixture can pose a safety hazard and a violation of applicable standards if the components are not properly engineered and integrated with the rest of the light fixture.

SUMMARY

In general, in one aspect, the disclosure relates to a light fixture. The light fixture can include a housing having at least one wall that forms a cavity, where a top end of the at least one wall includes a collar limiting feature. The light fixture can also include a collar disposed around the at least one wall of the housing, where the collar abuts against the collar limiting feature and is rotatable relative to the housing, where the collar includes a first cover coupling feature. The light fixture can also include a cover coupled to the collar, where the cover includes a first collar coupling feature, where the first collar coupling feature couples to the first cover coupling feature of the collar. The housing can be rotatable relative to the collar and the cover when the cover is at least partially decoupled from the collar, and the housing can be held in a fixed position relative to the collar and the cover when the cover is fully coupled to the collar.

In another aspect, the disclosure can generally relate to a collar for a light fixture. The collar can include a body having a top surface, an inner surface, and a shape formed by the inner surface, where the shape is substantially the same as a shape of an outer surface of a housing of the light fixture. The collar can also include a first cover coupling feature disposed at a first location on the body, where the first cover coupling feature is configured to couple to a cover of the light fixture. The body can be configured to secure the housing of the light fixture against the cover of the light fixture when the first cover coupling feature is coupled to the cover.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

FIGS. 6A and 6B show yet another light fixture in accordance with certain example embodiments.

DETAILED DESCRIPTION

Figures 1A, 1B:
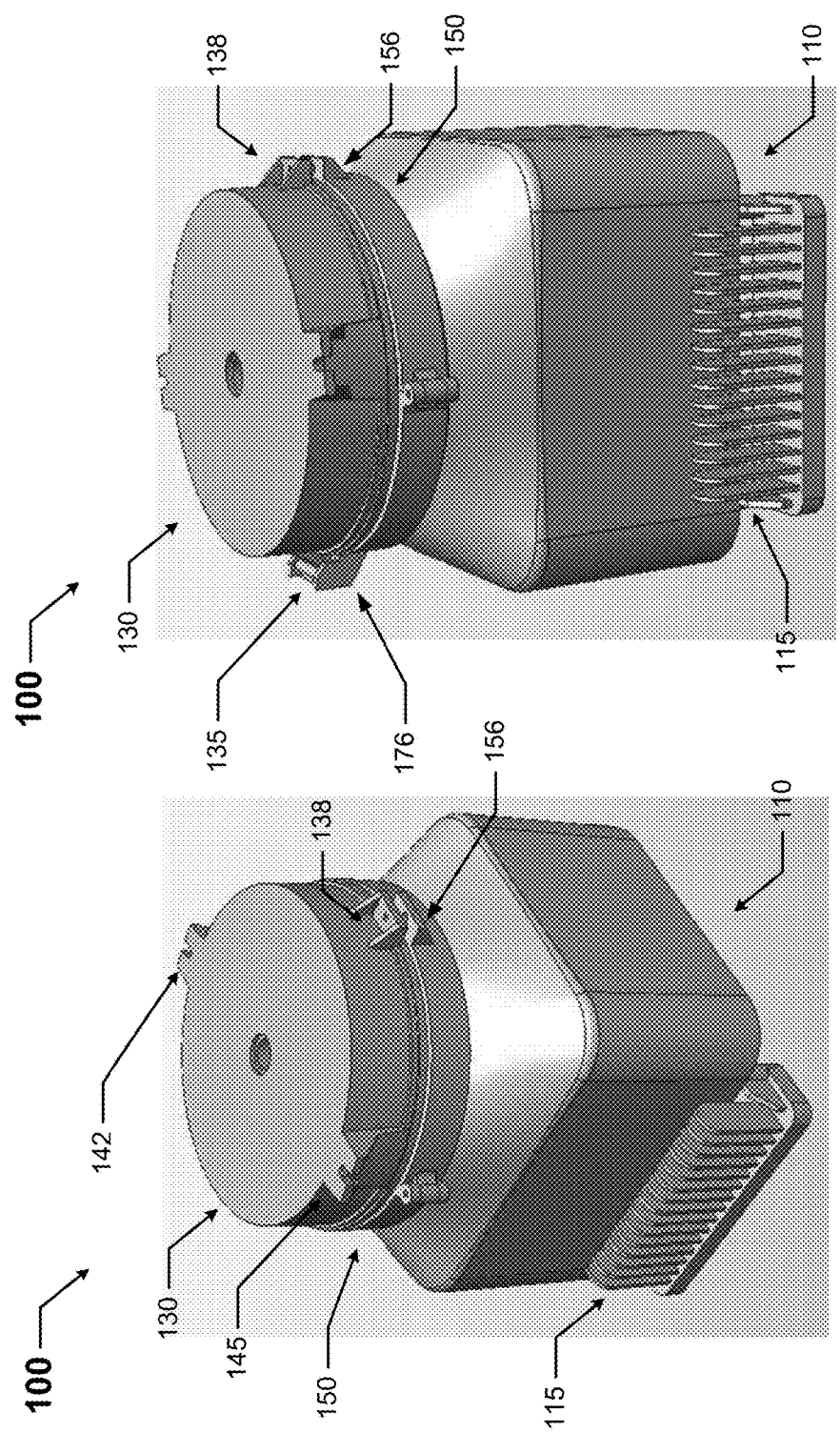
FIGS. 1A-1F shows various views of a light fixture in accordance with certain example embodiments.

In general, example embodiments provide systems, methods, and devices for collars for light fixtures. Example collars for light fixtures provide a number of benefits. Such benefits can include, but are not limited to, allowing easy access to components within the housing of a light fixture without unmounting the light fixture, ability to adjust a position of a light fixture without uninstalling or even powering down the light fixture, and compliance with industry standards that apply to light fixtures located in certain environments.

While example collars are shown and described herein as being used with light fixtures, example collars can be used with any other device, whether electrical, mechanical, or combination thereof, that is hung or suspended from or within a structure (e.g., a wall, a pole, a beam, a ceiling). While the term "collar" is used to describe example embodiments herein, other terms can also be used. Such other terms can include, but are not limited to, a sleeve, a flange, a ring, a band, a collet, and a retaining apparatus.

In some cases, the example embodiments discussed herein can be used in any type of hazardous environment, including but not limited to an airplane hangar, a drilling rig (as for oil, gas, or water), a production rig (as for oil or gas), a refinery, a chemical plant, a power plant, a mining operation, a wastewater treatment facility, and a steel mill. A user may be any person that interacts with light fixtures. Examples of a user may include, but are not limited to, an engineer, an electrician, an instrumentation and controls technician, a mechanic, an operator, a consultant, an inventory management system, an inventory manager, a foreman, a labor scheduling system, a contractor, and a manufacturer's representative.

The example collars (or components thereof, including controllers) described herein can be made of one or more of a number of suitable materials to allow the associated light fixture to meet certain standards and/or regulations while also maintaining durability in light of the one or more conditions under which the light fixtures and/or collars can be exposed. Examples of such materials can include, but are not limited to, aluminum, stainless steel, fiberglass, glass, plastic, ceramic, and rubber.

Example collars (or portions thereof) can be made from a single piece (as from a mold, injection mold, die cast, or extrusion process). In addition, or in the alternative, example collars (or portions thereof) can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, retaining, abutting against, or other similar terms. Such terms are merely meant to distinguish various elements and/or features within a component or device and are not meant to limit the capability or function of that particular element and/or feature. For example, a feature described as a "coupling feature" can couple, secure, fasten, abut against, and/or perform other functions aside from merely coupling.

A coupling feature (including a complementary coupling feature) as described herein can allow one or more components and/or portions of an example collar to become mechanically coupled, directly or indirectly, to another portion of the collar and/or to a light fixture (or portion thereof, such as a housing or a top hat). A coupling feature can include, but is not limited to, a portion of a hinge, an aperture, a recessed area, a protrusion, a slot, a spring clip, a male connector end, a female connector end, a tab, a detent, and mating threads. One portion of an example collar can be coupled to another portion of the collar and/or to a light fixture by the direct use of one or more coupling features.

In addition, or in the alternative, a portion of an example collar can be coupled to another portion of the collar and/or a light fixture using one or more independent devices that interact with one or more coupling features disposed on a component of the collar. Examples of such devices can include, but are not limited to, a pin, a male connector end, a female connector end, a hinge, epoxy, welding, a fastening device (e.g., a bolt, a screw, a rivet), and a spring. One coupling feature described herein can be the same as, or different than, one or more other coupling features described herein. A complementary coupling feature as described herein can be a coupling feature that mechanically couples, directly or indirectly, with another coupling feature.

In the foregoing figures showing hazardous location light fixtures with example collars, one or more of the components shown may be omitted, repeated, and/or substituted. Accordingly, embodiments of hazardous location light fixtures with example collars should not be considered limited to the specific arrangements of components shown in any of the figures. For example, features shown in one or more figures or described with respect to one embodiment can be applied to another embodiment associated with a different figure or description.

While example embodiments described herein are directed to light fixtures, collars can also be applied to any of a number of other devices that are mounted on a structure. Such other devices can include, but are not limited to, sensor devices, ceiling fans, signs, and enclosures. Any such device, including a light fixture, can include a housing, inside of which is disposed electrical, mechanical, electromechanical, and/or electronic equipment. Such equipment can include, but is not limited to, a controller (also called a control module), a hardware processor, a power supply (e.g., a battery, a driver, a ballast), a sensor module, a safety barrier, a sensor, sensor circuitry, a light source, electrical cables, and electrical conductors.

In certain example embodiments, light fixtures having example collars are subject to meeting certain standards and/or requirements. For example, the National Electric Code (NEC), Underwriters Laboratories (UL), the National Electrical Manufacturers Association (NEMA), the International Electrotechnical Commission (IEC), the Federal Communication Commission (FCC), the Illuminating Engineering Society (IES), and the Institute of Electrical and Electronics Engineers (IEEE) set standards as to electrical enclosures, wiring, and electrical connections. Use of example embodiments described herein meet (and/or allow a corresponding device to meet) such standards when required.

For example, example collars, when integrated with light fixtures, can allow the light fixture to meet the NEMA 4× standard. In such a case, the light fixture is constructed to provide a degree of protection to components (e.g., devices) disposed within the light fixture against, at least, corrosion, falling dirt, rain, sleet, snow, ice, windblown dust, splashing water, and hose-directed water. As a specific example, a light fixture with a NEMA 4× rating can provide protection with respect to harmful effects on equipment disposed within the light fixture due to ingress of water. Thus, an example collar that is mechanically coupled to such a light fixture must also meet these standards and/or allow the resulting light fixture to meet these standards.

A light fixture that includes an example collar can be located in any type of environment (e.g., indoors, outdoors, under water, in a climate controlled room). In addition, or in the alternative, light fixtures with example collars can be located in hazardous and/or marine environments. As defined herein, a hazardous location is any location where the enclosure can be exposed to extreme conditions. Extreme conditions can include, but are not limited to, high temperatures, low temperatures, temperature fluctuations, corrosion, humidity, chemicals, chemical vapors, vibrations, and dust. More information about hazardous locations and hazardous location enclosures can be found, for example, in Articles 500-506 and Articles 510-517 of the National Electric Code, which is incorporated herein by reference.

Examples of a hazardous location in which example embodiments can be used can include, but are not limited to, an airplane hangar, a drilling rig (as for oil, gas, or water), a production rig (as for oil or gas), a refinery, a chemical plant, a power plant, a mining operation, and a steel mill. A hazardous environment can include an explosive environment, which would require an enclosure with an example illuminated window to meet one or more requirements, including but not limited to maintaining flame paths.

An explosion-proof enclosure is a type of hazardous location electrical enclosure (e.g., a light fixture). In one or more example embodiments, an explosion-proof enclosure (also known as a flame-proof enclosure) is an electrical enclosure that is configured to contain an explosion that originates inside the enclosure. Further, the explosion-proof enclosure is configured to allow gases from inside the explosion-proof enclosure to escape across joints (also called gaps herein) of the explosion-proof enclosure and cool as the gases exit the explosion-proof enclosure. The joints are also known as flame paths and exist where two surfaces meet and provide a path, from inside the explosion-proof enclosure to outside the explosion-proof enclosure, along which one or more gases may travel. A joint may be a mating of any two or more surfaces. Each surface may be any type of surface, including but not limited to a flat surface, a threaded surface, and a serrated surface.

In one or more example embodiments, an explosion-proof enclosure (which can include a light fixture) is subject to meeting certain standards and/or requirements. For example, NEMA sets standards with which an electrical enclosure must comply in order to qualify as an explosion-proof enclosure. Specifically, NEMA Type 7, Type 8, Type 9, and Type 10 enclosures set standards with which an explosion-proof enclosure within certain hazardous locations must comply. For example, a NEMA Type 7 standard applies to electrical enclosures constructed for indoor use in certain hazardous locations. Hazardous locations may be defined by one or more of a number of authorities, including but not limited to the National Electric Code (e.g., Class 1, Division I) and UL (e.g., UL 1203). For example, a Class 1 hazardous area under the National Electric Code is an area in which flammable gases or vapors may be present in the air in sufficient quantities to be explosive.

As a specific example, NEMA standards for an explosion-proof enclosure of a certain size or range of sizes (e.g., greater than 100 in$^3$) may require that in a Group B, Division 1 area, any flame path of an explosion-proof enclosure must be at least 1 inch long (continuous and without interruption), and the gap between the surfaces cannot exceed 0.0015 inches. Standards created and maintained by NEMA may be found at www.nema.org/stds and are hereby incorporated by reference.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number and corresponding components in other figures have the identical last two digits.

In addition, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of collars for light fixtures will be described more fully hereinafter with reference to the accompanying drawings, in which example embodiments of collars for light fixtures are shown. Collars for light fixtures may, however, be embodied in many different forms and should not be construed as limited to the example embodiments set forth herein. Rather, these example embodiments are provided so that this disclosure will be thorough and complete, and will fully convey the scope of collars for light fixtures to those of ordinary skill in the art. Like, but not necessarily the same, elements (also sometimes called components) in the various figures are denoted by like reference numerals for consistency.

Terms such as "first", "second", "top", "bottom", "front", "rear", "side", "end", "left", "right", "outward", and "within" are used merely to distinguish one component (or part of a component or state of a component) from another. Such terms are not meant to denote a preference or a particular orientation, and are not meant to limit embodiments of collars for light fixtures. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1C:
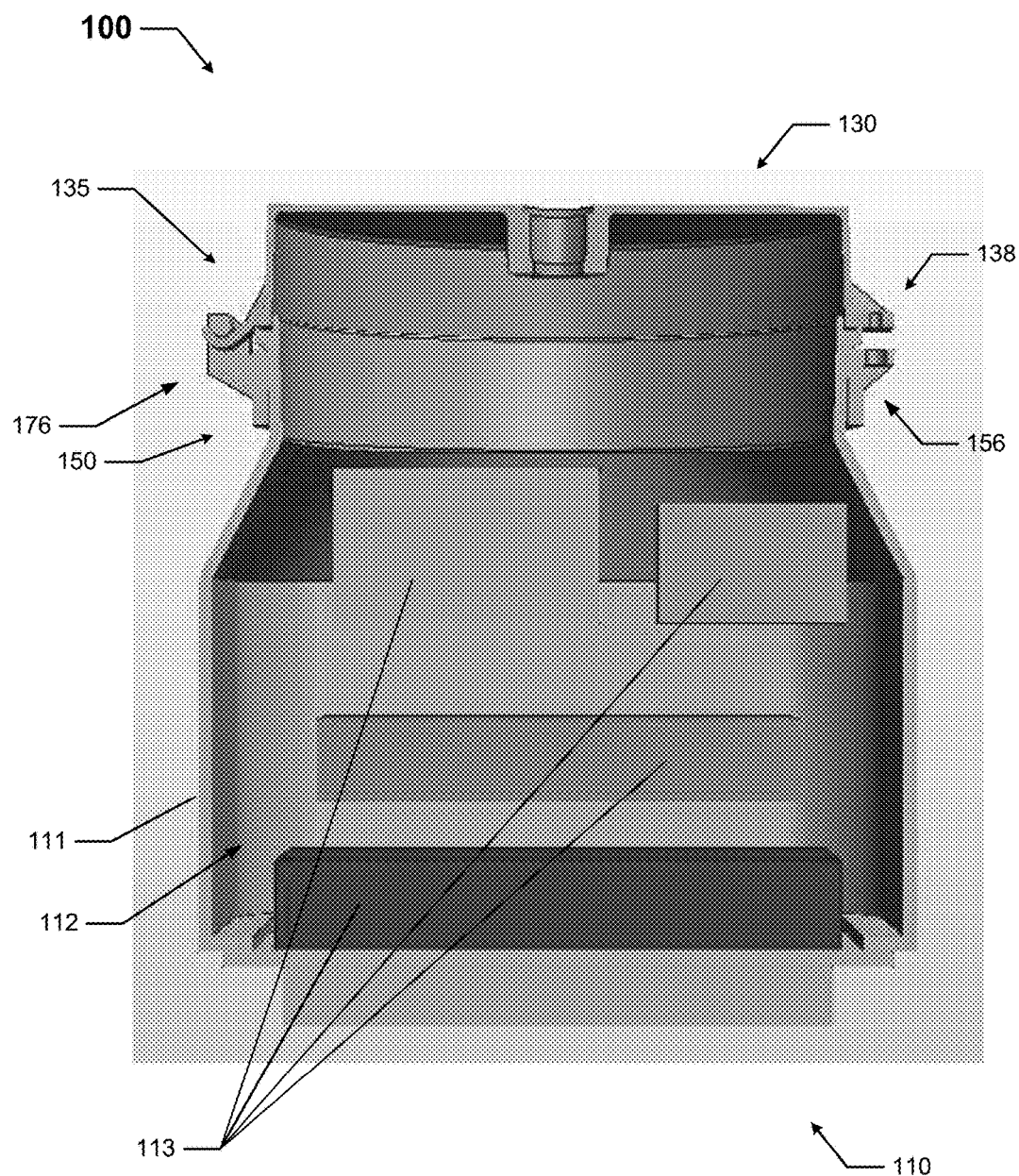
Figure 1D:
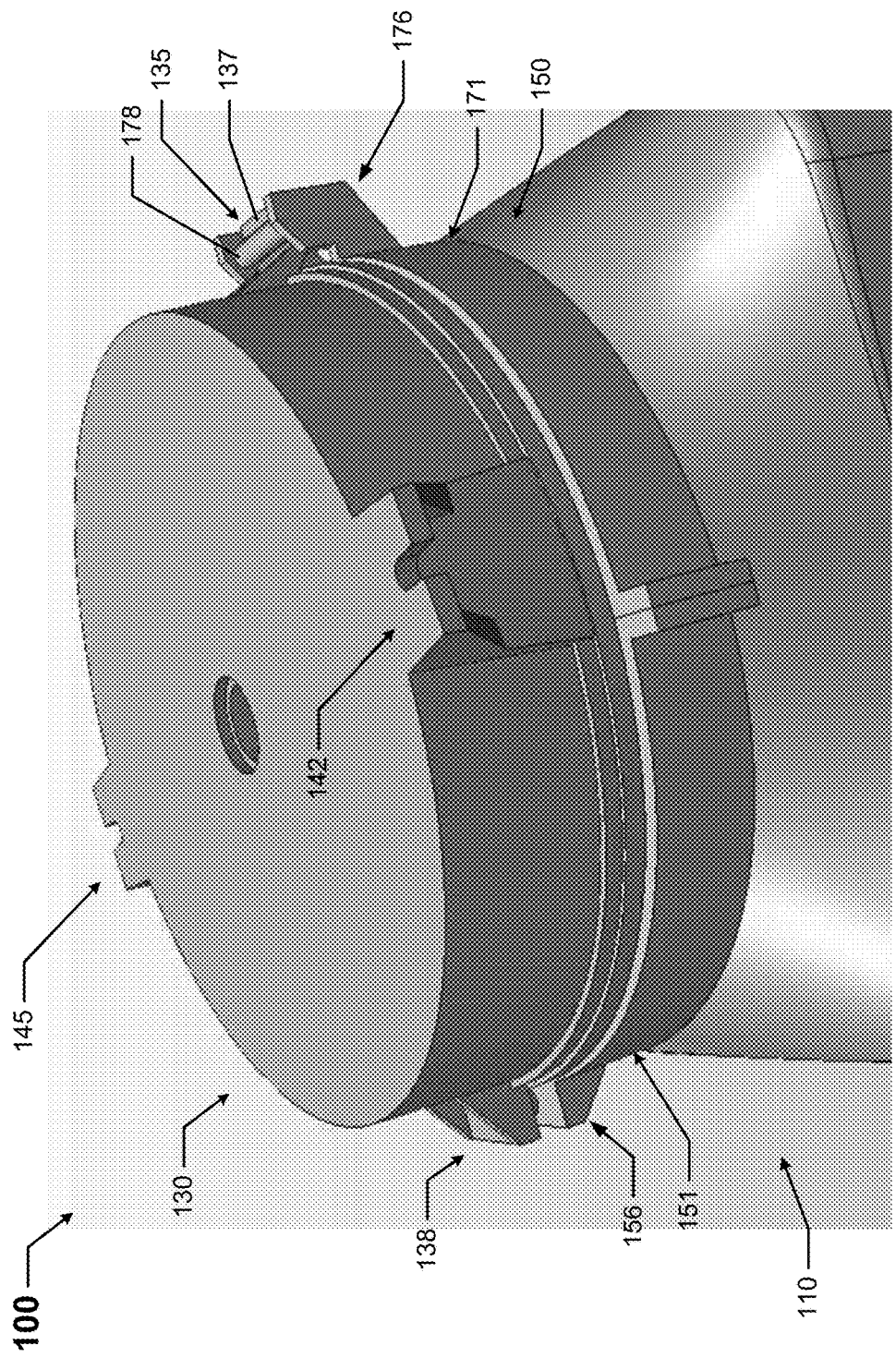
Figure 1E:
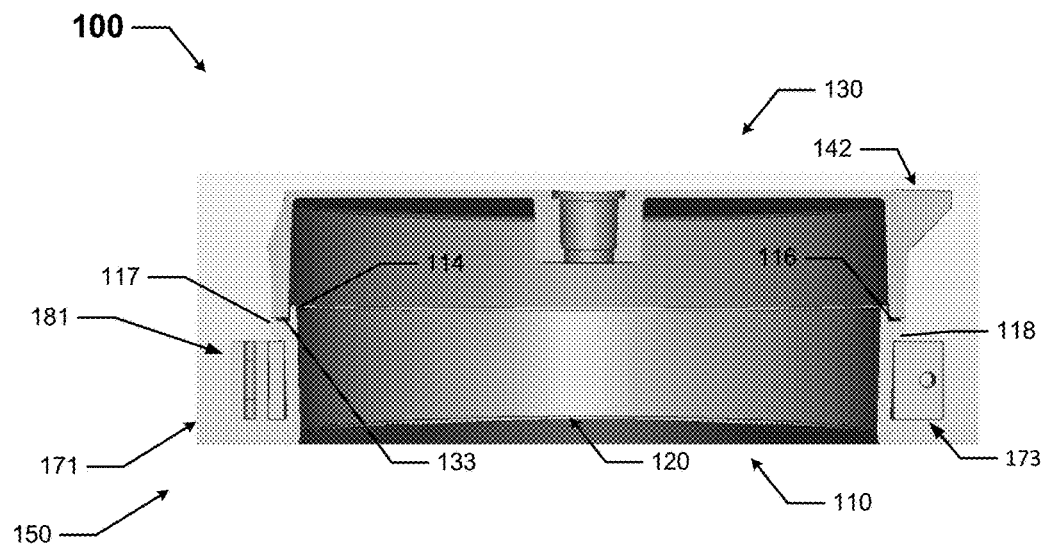
Figure 1F:
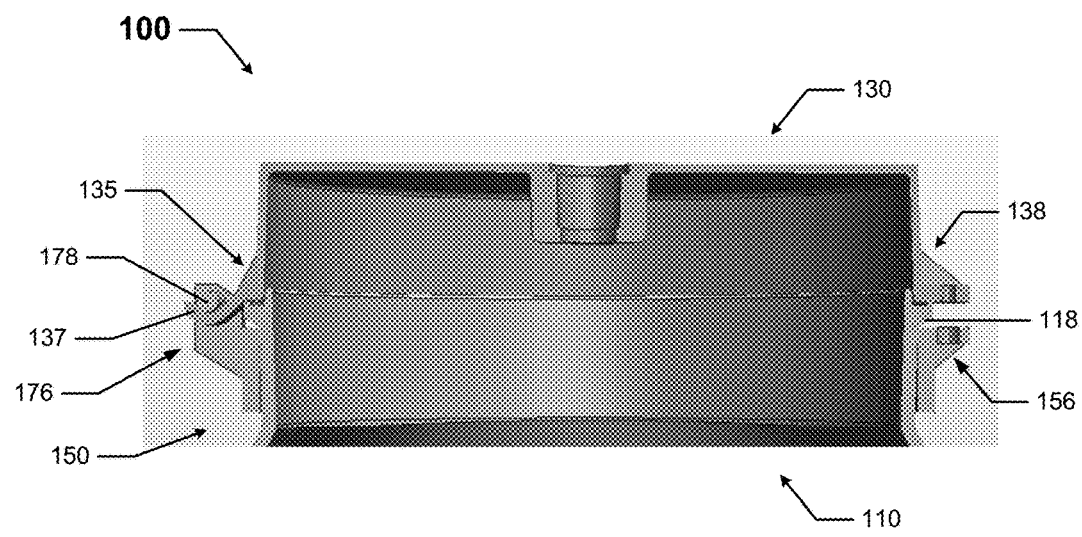

FIGS. 1A-1F shows various views of a light fixture 100 in accordance with certain example embodiments. FIGS. 2A-2D show various views of the collar 150 of FIGS. 1A-1E. FIGS. 3A-3D show various views of the housing 110 of FIGS. 1A-1E. FIGS. 4A-4F show various views of the cover 130 of FIGS. 1A-1E. Specifically, FIG. 1A shows a top-front-side perspective view of the light fixture 100. FIG. 1B shows a top-side view of the light fixture 100. FIG. 1C shows a cross-sectional side view of the light fixture 100. FIG. 1D shows a top-side view of the top portion of the light fixture 100. FIG. 1E shows a cross-sectional front view of the top portion of the light fixture 100. FIG. 1F shows a cross-sectional side view of the top portion of the light fixture 100.

Figure 2A:
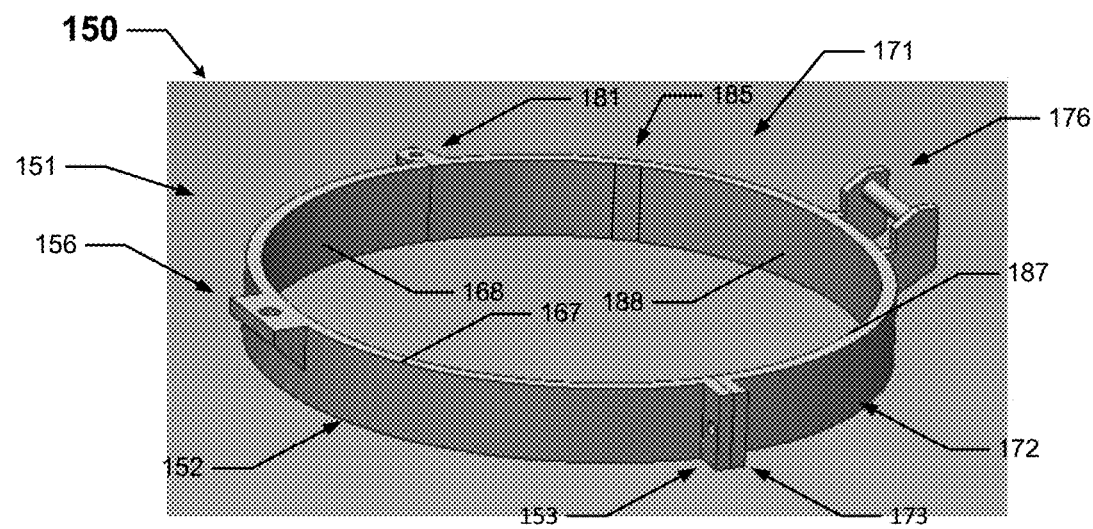
FIGS. 2A-2D show various views of the collar of FIGS. 1A-1E.
Figure 2B:
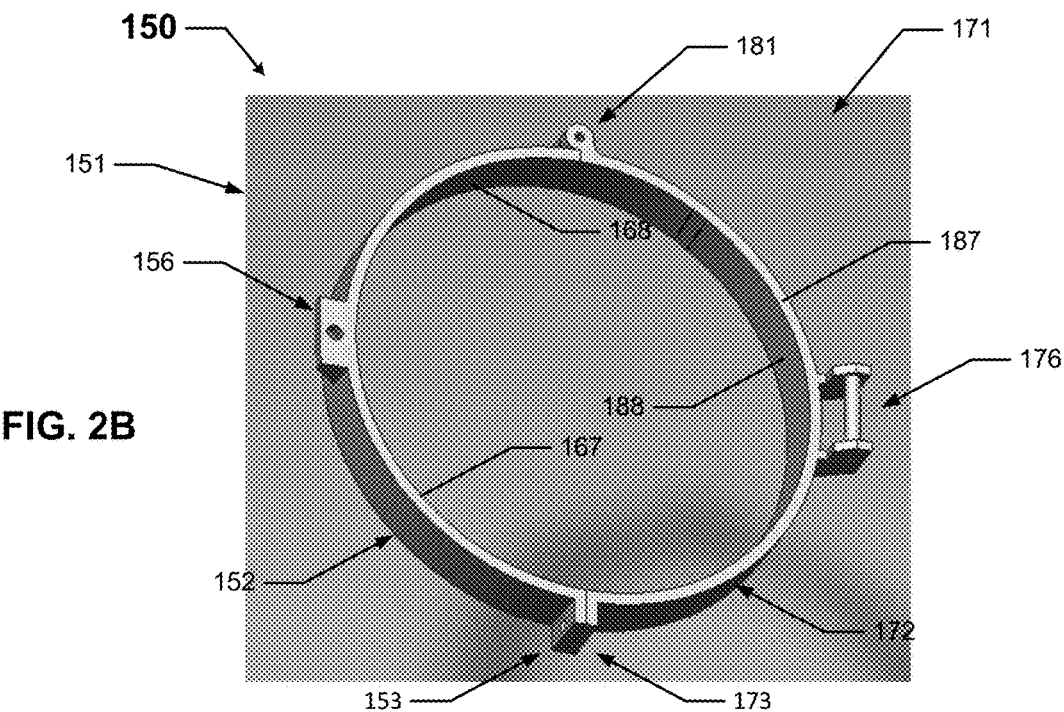
Figure 2C:
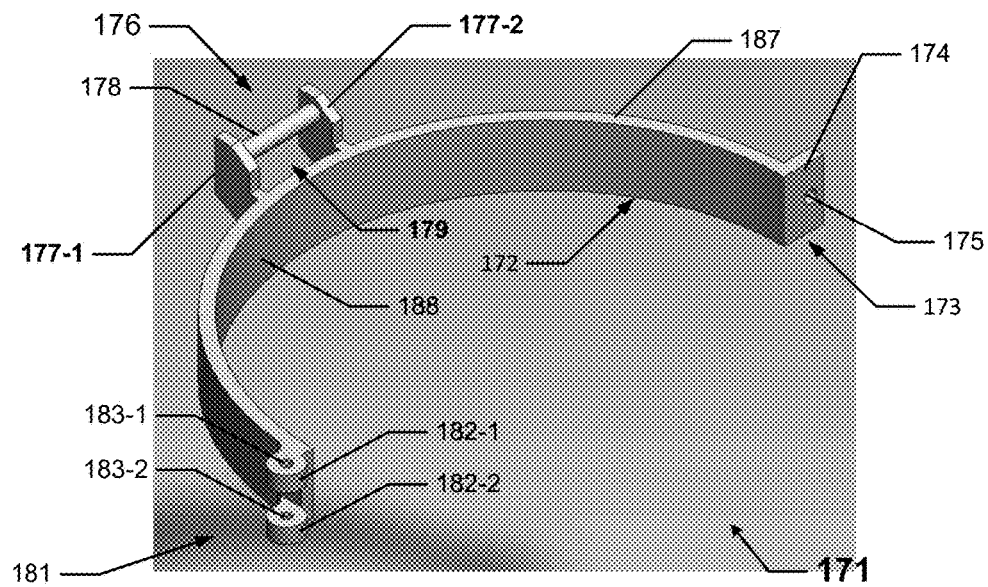
Figure 2D:
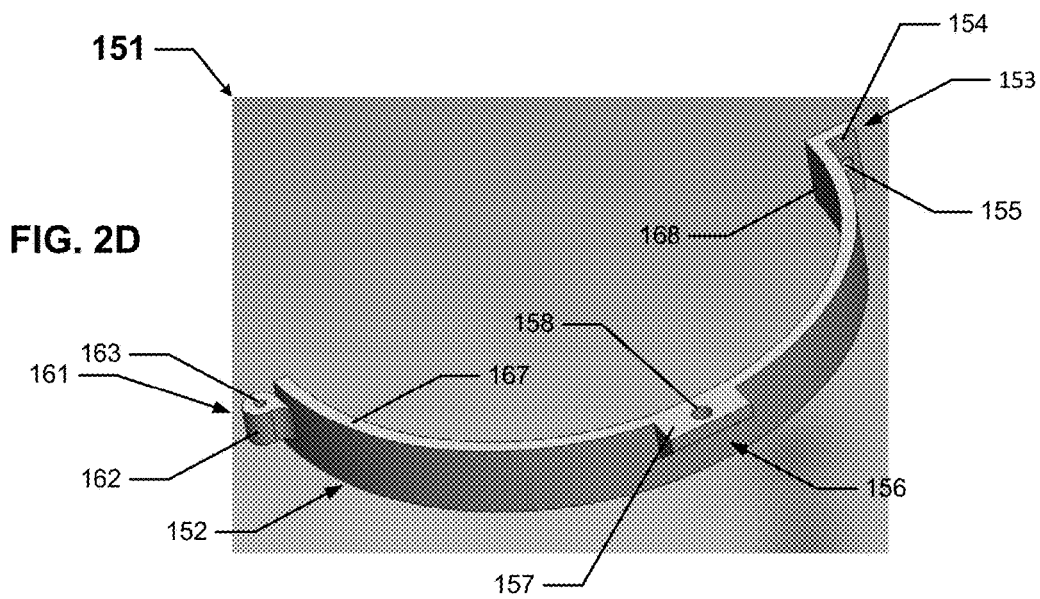
Figure 3A:
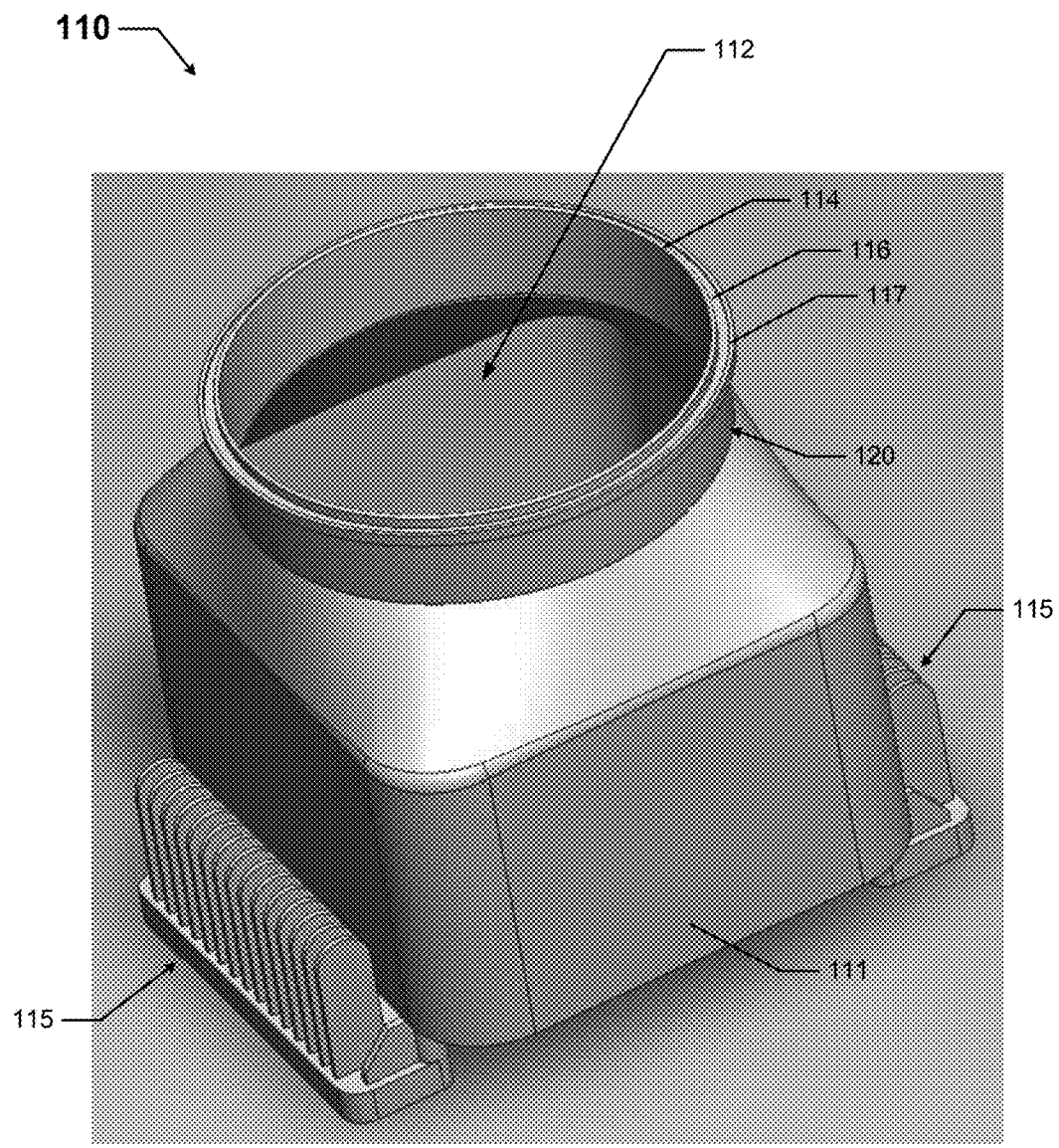
FIGS. 3A-3D show various views of the housing of FIGS. 1A-1E.
Figure 3B:
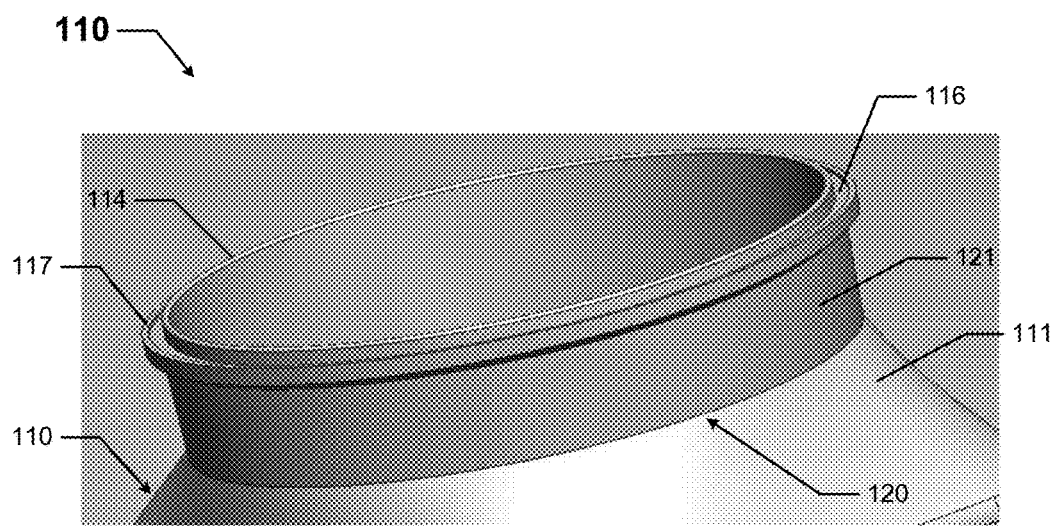
Figure 3C:
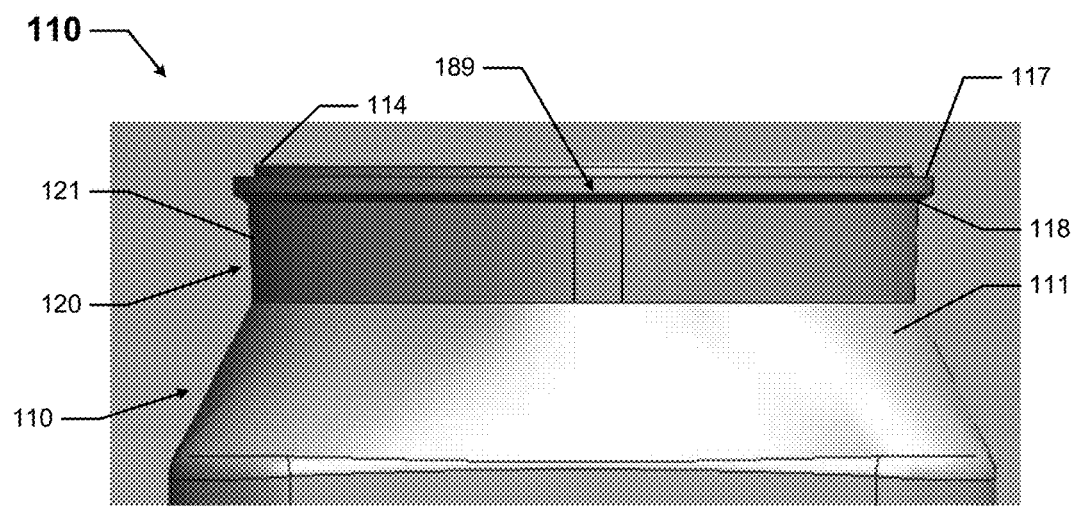
Figure 3D:
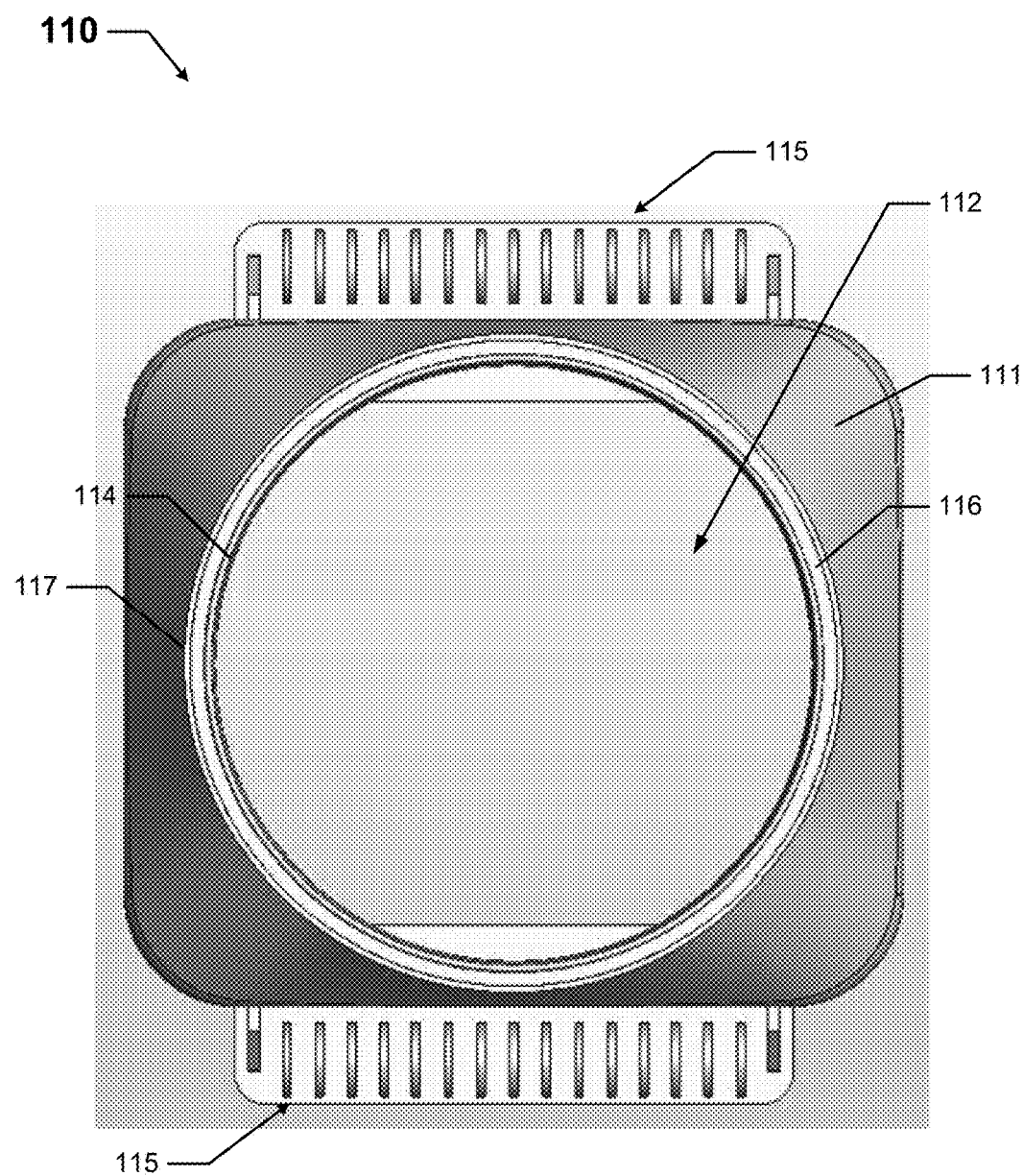
Figure 4A:
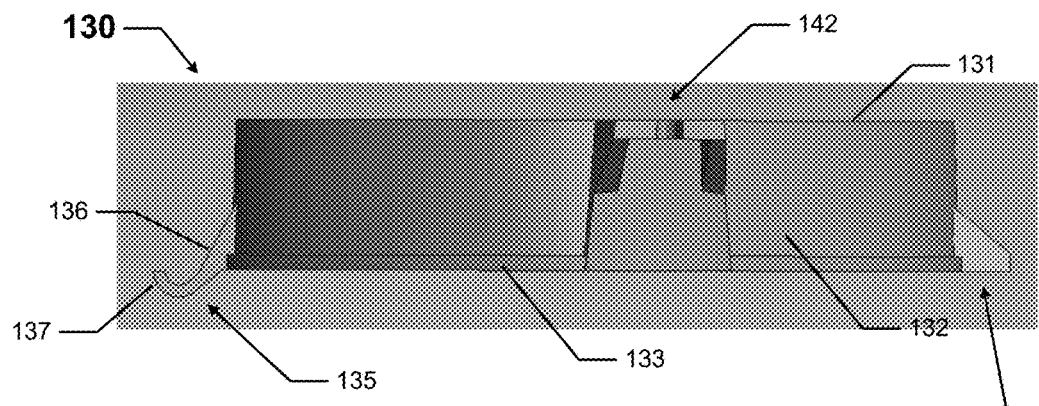
FIGS. 4A-4F show various views of the cover of FIGS. 1A-1E.
Figure 4B:
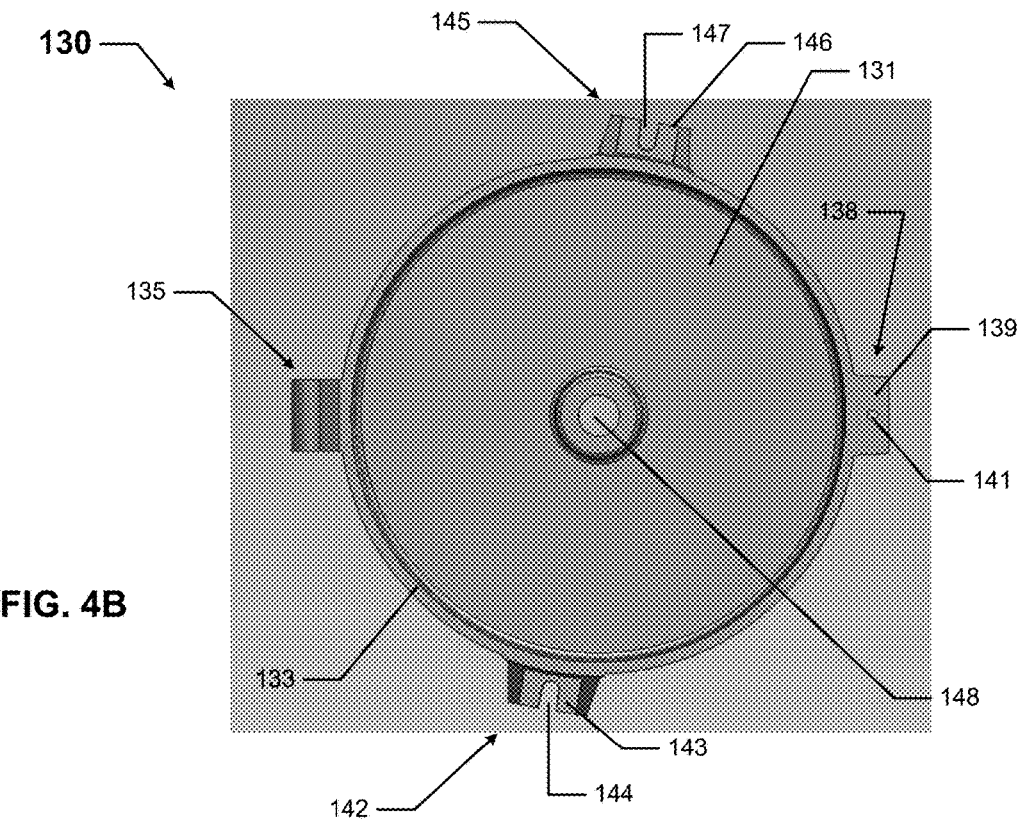
Figure 4C:
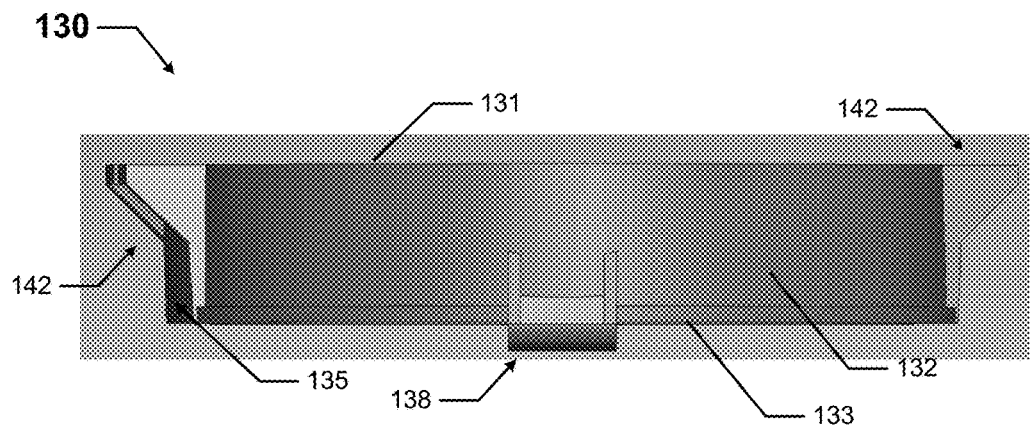
Figure 4D:
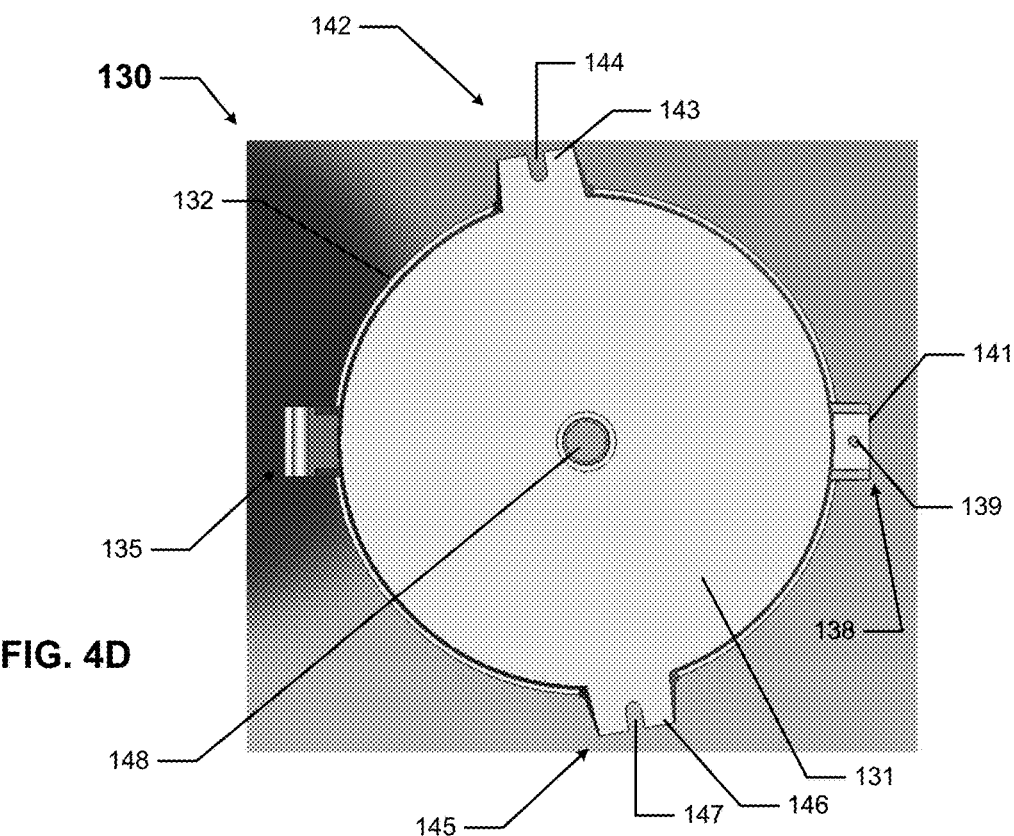
Figure 4E:
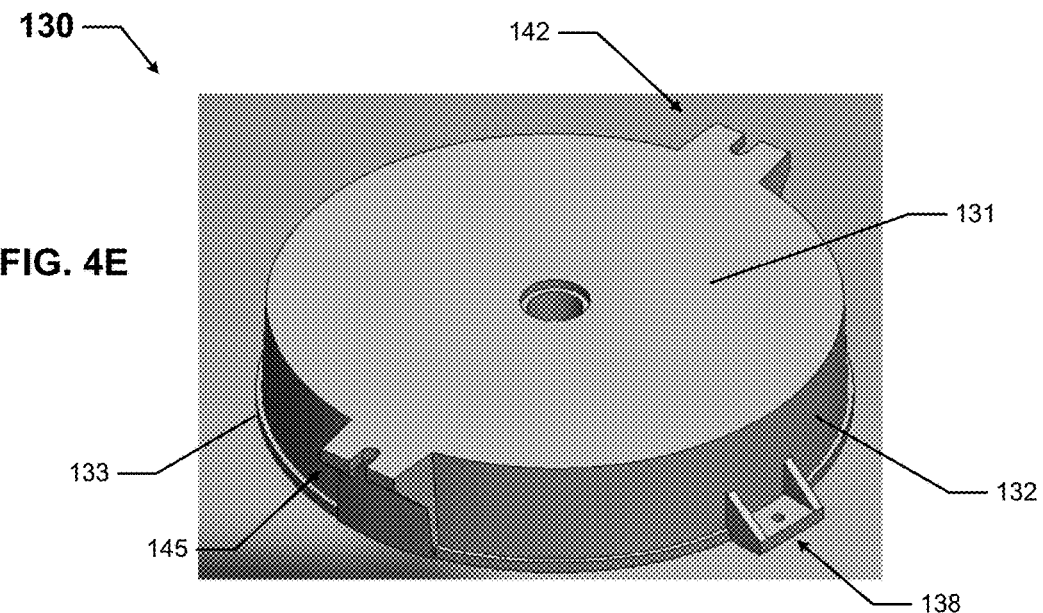
Figure 4F:
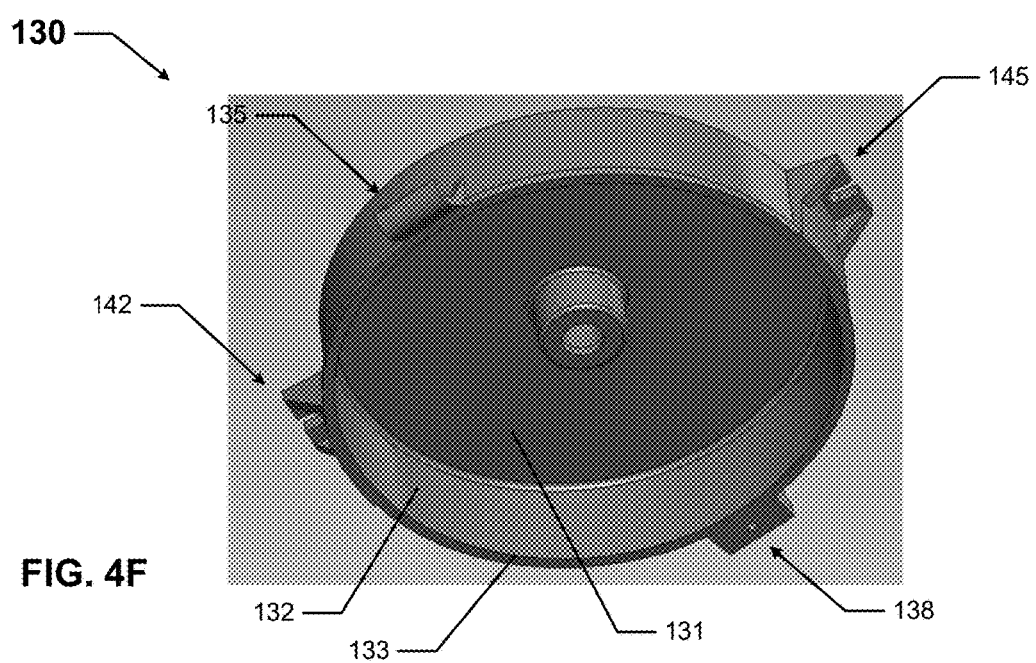

FIG. 2A shows a top-front-side perspective view of the collar 150. FIG. 2B shows a top perspective view of the collar 150. FIG. 2C shows a top-front-side perspective view of component 171 of the collar 150. FIG. 2D shows a top-rear-side perspective view of component 151 of the collar 150. FIG. 3A shows a top-front-side perspective view of the housing 110. FIG. 3B shows a top-side view of the top portion of the housing 110. FIG. 3C shows a side view of the top portion of the housing 110. FIG. 3D shows a top view of the housing 110. FIG. 4A shows a side view of the cover 130. FIG. 4B shows a bottom view of the cover 130. FIG. 4C shows a front view of the cover 130. FIG. 4D shows a top view of the cover 130. FIG. 4E shows a top-side-front perspective view of the cover 130. FIG. 4F shows a bottom-side-rear perspective view of the cover 130.

Referring to FIGS. 1A-4F, the light fixture 100 shown in FIGS. 1A-1F includes a housing 110, a cover 130, and a collar 150 all coupled to each other. The housing 110 includes one or more walls 111 that form a cavity 112, inside of which one or more components 113 (e.g., driver, energy storage device, controller, light engines) can be disposed. In addition, as can be seen in FIGS. 3A-3D, where the housing 110 is shown by itself, the housing 110 can have a top portion 120 that has one or more of a number of features.

Specifically, the top portion 120 of the housing 110 can include a wall 121, at the top end of which is disposed a channel 116 that is formed between an inner wall 114 and an outer wall 117. Since the outer wall 117 and at least part of the channel 116 in this case extend outward relative to the wall 121, a protrusion 118 is formed underneath the channel 116 and extends outward from the wall 121. When viewed from above, the wall 121, the inner wall 114, the outer wall 117, and the channel 116 are substantially circular in shape.

In certain example embodiments, the housing 110 includes one or more stops or similar features 189 (also called a rotational limiting feature 189 herein) that limit the range of rotation of the housing 110 relative to the collar 150. Such features can be used to prevent cable from becoming twisted. In addition, or in the alternative, such features can be used to limit the ways that a light fixture 100 can be oriented, for example so as to avoid contact of the light fixture 100 (or component thereof) with a structure in the ambient environment.

An example of such a feature 189 on the housing 110 is the stop (a protrusion) disposed on the outer surface 188 of the wall 121 of the top portion 120 of the housing 110, as shown in FIG. 3C. The feature 189 can have any of a number of shapes and/or configurations. For example, a feature can be a semi-spherical protrusion (as shown in FIG. 3C), a semi-cylindrical recess, or a planar protrusion. While the feature 189 in this case is disposed on an outer surface of the wall 121 of the top portion 120 of the housing 110, a feature 189 can additionally or alternatively be located on another part of the housing 110, including but not limited to the protrusion 118.

As another example, the collar 150 can have multiple bore diameters. In such a case, one bore would engage the protrusion 118 of the top portion 120 of the housing 110, another bore would lock the housing 110 in place on the wall 121 of the top portion 120 of the housing 110, and yet another bore would clear the feature 189. In some cases, feature 189 extends up from the bottom of the wall 121 of the top portion 120 of the housing 110, but stop short of the protrusion 118 (e.g., ½ way to the protrusion 118). In such a case, a vertical rib can be disposed in the third bore listed above in the collar 150, and this vertical rib can interfere with the feature 189, thereby preventing full rotation of the housing 110 relative to the collar 150.

Also, while there is a single feature 189 shown in FIG. 3C, there can be multiple such features on the housing 110. In any case, each feature 189 disposed on the housing 110 can engage (e.g., abut against) a complementary feature 185 on the collar 150, as described below. In this way, one or more of the features 185 of the collar 150 and one or more features 189 of the housing 110 can be used to limit the range of rotation of the housing 110 relative to the collar 150.

The cover 130 of the light fixture 100 is disposed on top of the housing 110. The cover 130 can be called by any of a number of other names in the art, including but not limited to a top hat. The cover 130 can have one or more of a number of features. For example, as shown in FIGS. 1A-1F and 4A-4F, the cover 130 can have one or more walls. In this case, the cover 130 has a top wall 131 and a side wall 132, where the top wall 131 is substantially planar, and where the side wall 132 forms a cylinder that is perpendicular to the top wall 131. In this case, there is an aperture 148 that traverses the top wall 131 and can be used to retain a conduit (holding one or more electrical cables) for providing power and/or control to the light fixture and/or a structure (e.g., an extension) for mounting the light fixture.

Another feature of the cover 130 can be one or more coupling features for coupling the cover 130 to a structure. Examples of a structure can include, but are not limited to, a ceiling, a wall, a pole, a rail, a beam, a piece of wood, and a lattice. In this case, two such coupling features are coupling feature 142 and coupling feature 145. Coupling feature 142 extends laterally away from and is planar with the top wall 131. Coupling feature 142 includes a body 143 with an elongated aperture 144 disposed at the distal end of the body 143 in the middle of the body 143 along the width of the body 143. Coupling feature 145 is similarly configured. Specifically, coupling feature 145 includes a body 146 with an elongated aperture 147 disposed at the distal end of the body 146 in the middle of the body 146 along the width of the body 146.

Coupling features 142 and coupling feature 145 can each receive a fastening device (e.g., a bolt) to become indirectly coupled to a structure. Alternatively, if the structure has a protrusion that can be disposed within aperture 144 and aperture 147, then the cover 130 can be directly coupled to a structure. In this case, coupling feature 142 is disposed between coupling feature 135 and coupling feature 138 (both described below) along the outer perimeter of the top wall 131. Similarly, coupling feature 145 is disposed between coupling feature 135 and coupling feature 138 along the outer perimeter of the top wall 131, but somewhat opposite coupling feature 142.

The cover 130 can also include one or more coupling features that allow the cover to couple to the collar 150. For example, in this case, the cover 130 includes coupling feature 135 and coupling feature 138. Coupling feature 135 in this case extends from the side wall 132 toward the bottom of the side wall 132 (opposite the top of the side wall 132 where the side wall 132 meets the top wall 131). Specifically, coupling feature 135 has a body 136 that protrudes away and downward from the side wall 132. The distal end of the body 136 has a hook 137, which is used to engage the coupling feature 176 (discussed below) of the collar 150.

Coupling feature 138 in this case also extends from the side wall 132 toward the bottom of the side wall 132 (substantially opposite from coupling feature 135 along the side wall 132). Specifically, coupling feature 138 has a body 141 that protrudes away from the side wall 132 and has an aperture 139 that traverses therethrough. In this example, the aperture 139 receives a fastening device, which also traverses an aperture in coupling feature 156 (described below) of the collar 150. The configuration and orientation of coupling feature 135 and coupling feature 138 of the cover 130 is to allow the cover 130 to be hingedly coupled to the collar 150 (using coupling feature 135) and to retain the cover 130 in a closed position relative to the housing 110 when coupling feature 138 is engaged (coupled to coupling feature 156 of the collar 150).

The cover 130 can also include one or more features that are used to couple to (e.g., abut against, form a seal with) the housing 110. For example, in this case, the perimeter of the bottom of the side wall 132 has a mating protrusion 133 disposed thereon. The mating protrusion 133 has a width and circular shape (when viewed from below) that corresponds to the width (defined by the inner wall 114 and the outer wall 117) and shape of the channel 116 in the top portion 120 of the housing 110.

In certain example embodiments, there can be a sealing member (e.g., a gasket) disposed in the channel 116, which is abutted by the mating protrusion 133 of the cover 130 when the cover 130 is coupled to the collar 150. Alternatively, the channel 116 can be empty, so that when the cover 130 is coupled to the collar 150, the mating protrusion 133 of the cover 130 makes direct contact with the channel 116 of the housing 110.

The collar 150, as shown in FIGS. 1A-2D, has a body (e.g., a wall) that has an inner surface and a top surface. The body of the collar 150 can be one piece or can be made of multiple pieces. For example, in this case, the body of the collar 150 is made of two pieces, piece 151 and piece 171, that are coupled to each other. Piece 151 includes a body 152 having a top surface 167 and an inner surface 168. When viewed from above, the body 152 of piece 151 is substantially semi-circular. Similarly, piece 171 includes a body 172 having a top surface 187 and an inner surface 188. When viewed from above, the body 172 of piece 171 is substantially semi-circular.

As mentioned above, piece 151 and piece 171 are coupled to each other. For this coupling of piece 151 and piece 171 to occur, piece 151 and piece 171 can each include one or more coupling features. For example, in this case, piece 151 includes coupling feature 161 disposed at one end of the body 152, and coupling feature 153 disposed at the opposing end of the body 152. Coupling feature 153 of piece 151 is configured to couple to complementary coupling feature 173 (described below) of piece 171, and coupling feature 161 of piece 151 is configured to couple to complementary coupling feature 181 (described below) of piece 171.

In this example, coupling feature 161 of piece 151 is part of a hinge that allows piece 151 and piece 171 to be hingedly movable with respect to each other. Specifically, coupling feature 161 is a protrusion 162 that extends from the outer surface of the body 152 of piece 151, where the protrusion 162 has an aperture 163 that traverses its height, as for receiving a fastening device (e.g., a pin). Further, coupling feature 153 of piece 151 is used in conjunction with coupling feature 173 of piece 171 to keep piece 151 and piece 171 detachably coupled to each other. Specifically, coupling feature 153 is a lateral extension 154 at the end of piece 151, where the lateral extension 154 has an aperture 155 that traverses therethrough, as for receiving a fastening device (e.g., a screw).

Similarly, piece 171 has coupling features that complement coupling feature 153 and coupling feature 161 of piece 151. For example, in this case, coupling feature 181 of piece 171 is part of a hinge that allows piece 151 and piece 171 to be hingedly movable with respect to each other. Specifically, coupling feature 181 is a pair of protrusions 182 (protrusion 182-1 and protrusion 182-2) that are substantially identical to each other and each extends from the outer surface of the body 172 of piece 171, where protrusion 182-1 is disposed directly above protrusion 182-2, and where protrusion 182-1 and protrusion 182-2 are separated by the approximate height of the protrusion 162 of coupling feature 161 of piece 151. Each protrusion 182 has an aperture 183 that traverses its height, as for receiving a fastening device (e.g., a pin). Specifically, aperture 183-1 traverses the height of protrusion 182-1, and aperture 183-2 traverses the height of protrusion 182-2.

Further, coupling feature 173 of piece 171 is used in conjunction with coupling feature 153 of piece 151 to keep piece 151 and piece 171 detachably coupled to each other. Specifically, coupling feature 173 is a lateral extension 174 at the end of piece 171, where the lateral extension 174 has an aperture 175 that traverses therethrough, as for receiving a fastening device (e.g., a screw). Lateral extension 174 of coupling feature 173 of piece 171 abuts against lateral extension 154 of coupling feature 153 of piece 151.

This configuration of coupling feature 153, coupling feature 161, coupling feature 173, and coupling feature 181, as shown in FIGS. 1A-2D, provide an example of how the collar 150 can be allowed to be disposed around the outer surface of the wall 121 of the top portion 120 of the housing 110. The collar 150 can easily be removed by decoupling coupling feature 153 and coupling feature 173 from each other, and then pushing piece 151 and piece 171 apart from each other using the hinge formed by coupling feature 161 and coupling feature 181. Reversing this process can allow the collar 150 to be positioned against the outer surface of the wall 121 of the top portion 120 of the housing 110.

In certain example embodiments, the collar 150 includes one or more stops or similar features 185 (also called a rotational limiting feature 185 herein) that limit the range of rotation of the housing 110 relative to the collar 150. Such features can be used to prevent cable from becoming twisted. In addition, or in the alternative, such features can be used to limit the ways that a light fixture 100 can be oriented, for example so as to avoid contact of the light fixture 100 (or component thereof) with a structure in the ambient environment.

An example of such a feature 185 on the collar 150 is the stop (a protrusion) disposed on the inner surface 188 of the body 172 of piece 171, as shown in FIGS. 2A and 2B. The feature 185 can have any of a number of shapes and/or configurations. For example, a feature 185 can be a semi-spherical protrusion (as in this case), a semi-cylindrical recess, or a planar protrusion. While the feature 185 in this case is disposed on an inner surface (e.g., inner surface 188) of the collar 150, a feature 185 can additionally or alternatively be located on another part of the collar 150, including but not limited to a bottom surface and a top surface (e.g., top surface 187).

Also, while there is a single feature 185 shown in FIGS. 2A and 2B, there can be multiple such features on the collar 150, either on one piece (e.g., piece 171) or on multiple pieces. In any case, each feature 185 disposed on the collar 150 can engage (e.g., abut against) a complementary feature 189 on the housing 110, as described above. In this way, one or more of the features 185 of the collar 150 and one or more features 189 of the housing 110 can be used to limit the range of rotation of the housing 110 relative to the collar 150. In certain example embodiments, such rotational limiting features (e.g., feature 185, feature 189) can additionally or alternatively be disposed on one or more other components of the light fixture 100. For example, rather than being disposed on the collar 150, a feature 185 can be disposed on an outer surface of the side wall 132 of the cover 130.

As discussed above, the collar 150 can have one or more coupling features that couple to corresponding coupling features of the cover 130. For example, in this case, the collar 150 includes coupling feature 176, which is configured to couple to coupling feature 135 of the cover 130. Here, coupling feature 176 is part of piece 171 of the collar 150. Coupling feature 176 in this example has two protrusions 171 (protrusion 171-1 and protrusion 171-2) that are parallel with each other and extend away from the outer surface of the body. Disposed between protrusion 171-1 and protrusion 171-2 is a linear segment 178, around which the hook 137 of coupling feature 135 of the cover 130 is disposed to allow for rotational movement of the coupling feature 135 of the cover 130 relative to the linear segment 178 of the coupling feature 176 of the collar 150.

As another example, in this case, the collar 150 includes coupling feature 156, which is configured to couple to coupling feature 135 of the cover 130. Here, coupling feature 156 is part of piece 151 of the collar 150. Coupling feature 156 in this example is a lateral extension 157 to extends along the top of the outer surface of wall 152 of piece 151. The lateral extension 157 has an aperture 158 that traverses therethrough, as for receiving a fastening device (e.g., a screw, a bolt). Lateral extension 157 of coupling feature 156 of piece 151 abuts against (or comes close to abutting against) the body 141 of the coupling feature 138 of the cover 130, and when this occurs the aperture 158 that traverses the lateral extension 157 of coupling feature 156 of the collar 150 is substantially aligned with the aperture 139 that traverses the body 141 of the coupling feature 138 of the cover 130.

This configuration of coupling feature 135, coupling feature 138, coupling feature 156, and coupling feature 176, as shown in FIGS. 1A-2D and 4A-4F, provide an example of how the collar 150 and the cover 130 can be coupled to each other. The housing 110 can easily be rotated relative to the collar 150 and/or the cover 130 can be opened relative to the housing 110 (thereby allowing access to the components 113 disposed within the cavity 112 of the housing 110) by decoupling coupling feature 156 of the collar 150 and coupling feature 138 of the cover 130 from each other, and then lifting the cover 130 away from the collar 150 and the housing 110 using the hinge formed by coupling feature 135 of the cover 130 and coupling feature 176 of the collar 150. Reversing this process can allow the rotational position of the housing 110 relative to the collar 150 to be fixed and/or to allow the cover 130 to apply a compressive force against (and so create a proper seal with) the top portion 120 of the housing 110.

Figure 5A:
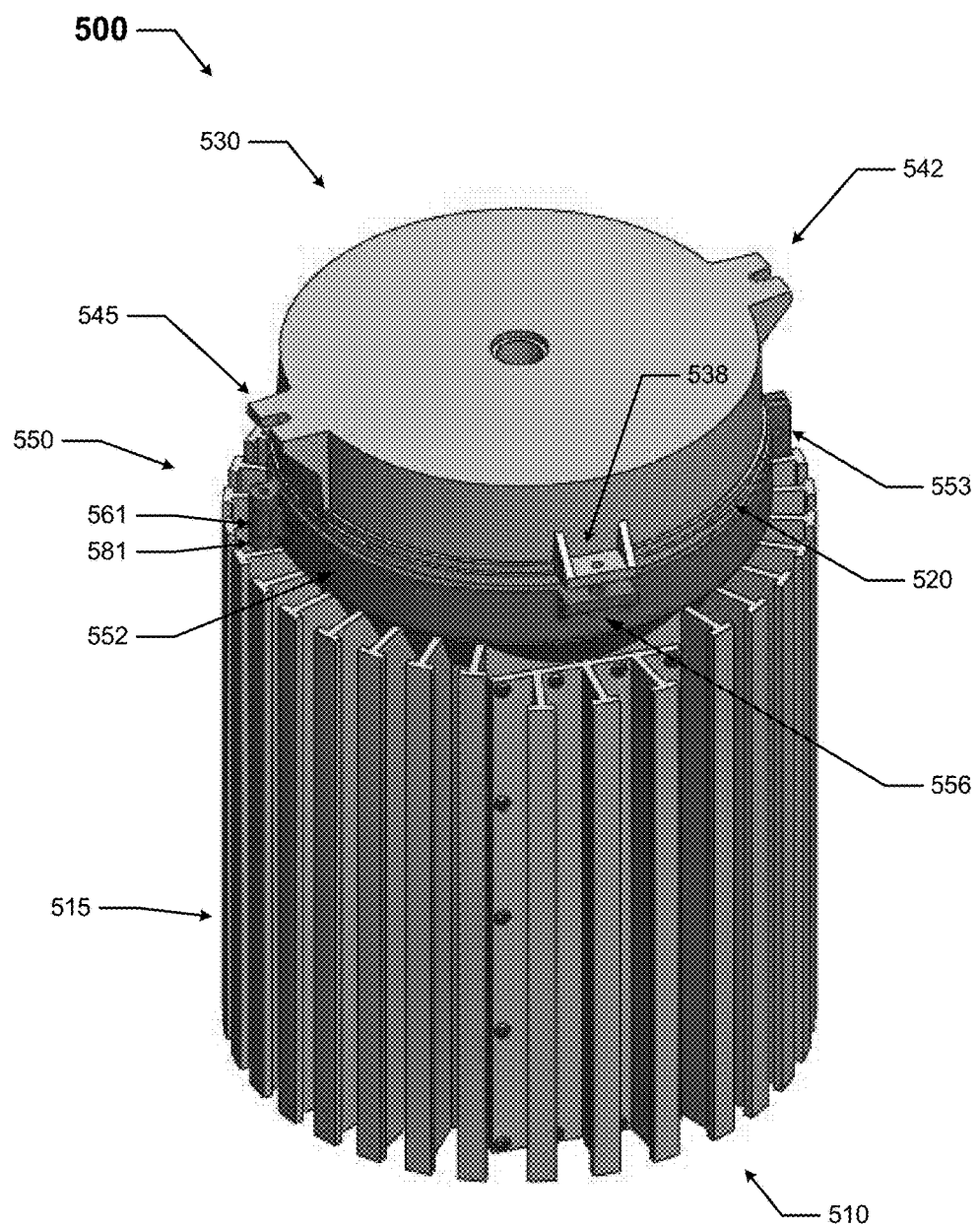
FIGS. 5A and 5B show another light fixture in accordance with certain example embodiments.
Figure 5B:
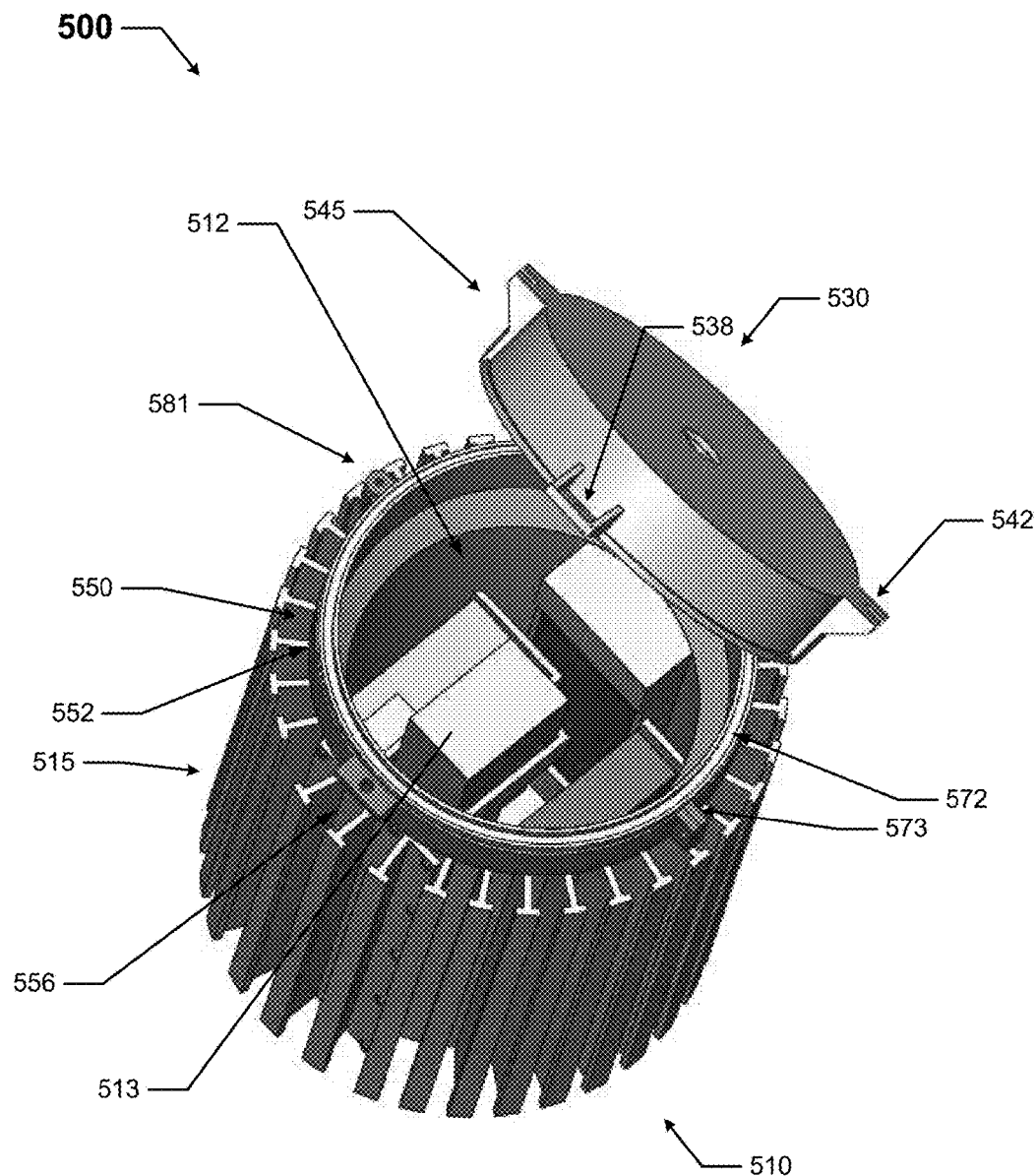

Example collars can be used with housings and covers of light fixtures having any type of configuration. For example, the cross-sectional shape of the top portion of the housing and the cross-sectional shape of the collar can be something (e.g., oval, square) other than circular. FIGS. 5A-7B below show other different examples of how example embodiments can work with varying configurations. For instance, FIGS. 5A and 5B show another light fixture 500 in accordance with certain example embodiments. Specifically, FIG. 5A shows a front-side-top view of the light fixture 500 with the cover 530 closed, and FIG. 5B shows a front-side-top view of the light fixture 500 with the cover 530 open.

Referring to FIGS. 1A-5B, the light fixture 500 of FIGS. 5A and 5B is substantially the same as the light fixture 100 of FIGS. 1A-4F above, except as described below. For example, the housing 510 of the light fixture 500 of FIGS. 5A and 5B have heat sink fins 515 that extend vertically along most of the height of the housing 510. Further, the components 513 of the light fixture 500 are disposed within the cavity 512 of the housing 510. In addition, the cover 530 includes coupling feature 545 (substantially similar to coupling feature 145), coupling feature 538 (substantially similar to coupling feature 138), and coupling feature 542 (substantially similar to coupling feature 142). Also, hidden from view, the cover 530 has the equivalent of coupling feature 135 from FIGS. 1A-4F.

Further, the collar 550 of the light fixture 500 of FIGS. 5A and 5B is made up of portion 552 and portion 572, where portion 552 includes coupling feature 561, coupling feature 556, and coupling feature 553, and where portion 572 includes coupling feature 581 and 573. While hidden from view, portion 572 of the collar 550 also includes the equivalent of coupling feature 176. In this case, the height of the top portion 520 of the housing 510 is much shorter than the height of the top portion 120 of the housing 110. Otherwise, the top portion 520 of the housing of FIGS. 5A and 5B is configured substantially the same as the top portion 120 of the housing 110 of FIGS. 1A-3D. Thus, the example shown in FIGS. 5A and 5B conveys that example collars described herein can be used with housings (and in particular, top portions of the housings) having varying configurations.

FIGS. 6A and 6B show yet another light fixture 600 in accordance with certain example embodiments. Specifically, FIG. 6A shows a front-side-top view of the light fixture 600 with the cover 630 open, and FIG. 6B shows a different front-side-top view of the light fixture 600 with the cover 630 open. Referring to FIGS. 1A-6B, the light fixture 600 of FIGS. 6A and 6B is substantially the same as the light fixture 100 of FIGS. 1A-4F and the light fixture 500 of FIGS. 5A and 5B above, except as described below. For example, the housing 610 of the light fixture 600 of FIGS. 6A and 6B have heat sink fins 615 that extend vertically along most of the height of the housing 610. Further, the collar 650 is disposed around the housing 610 and is hingedly coupled to the cover 630.

In this case, the cover 630 of the light fixture 600 of FIGS. 6A and 6B lacks the equivalent of coupling feature 142 and coupling feature 145 for coupling the cover 630 to a structure. Instead, cover 630 includes coupling feature 690 for coupling the cover 630 to a structure. In this case, coupling feature 690 includes an extension 692 that has an aperture 691 that traverses a portion of its height from the bottom of the extension 692. The aperture 691 can have a shape and height that allows the aperture 691 to receive a mounting pole. Thus, the example shown in FIGS. 6A and 6B conveys that example collars described herein can be used with covers of light fixtures having varying configurations.

Figures 7A, 7B:
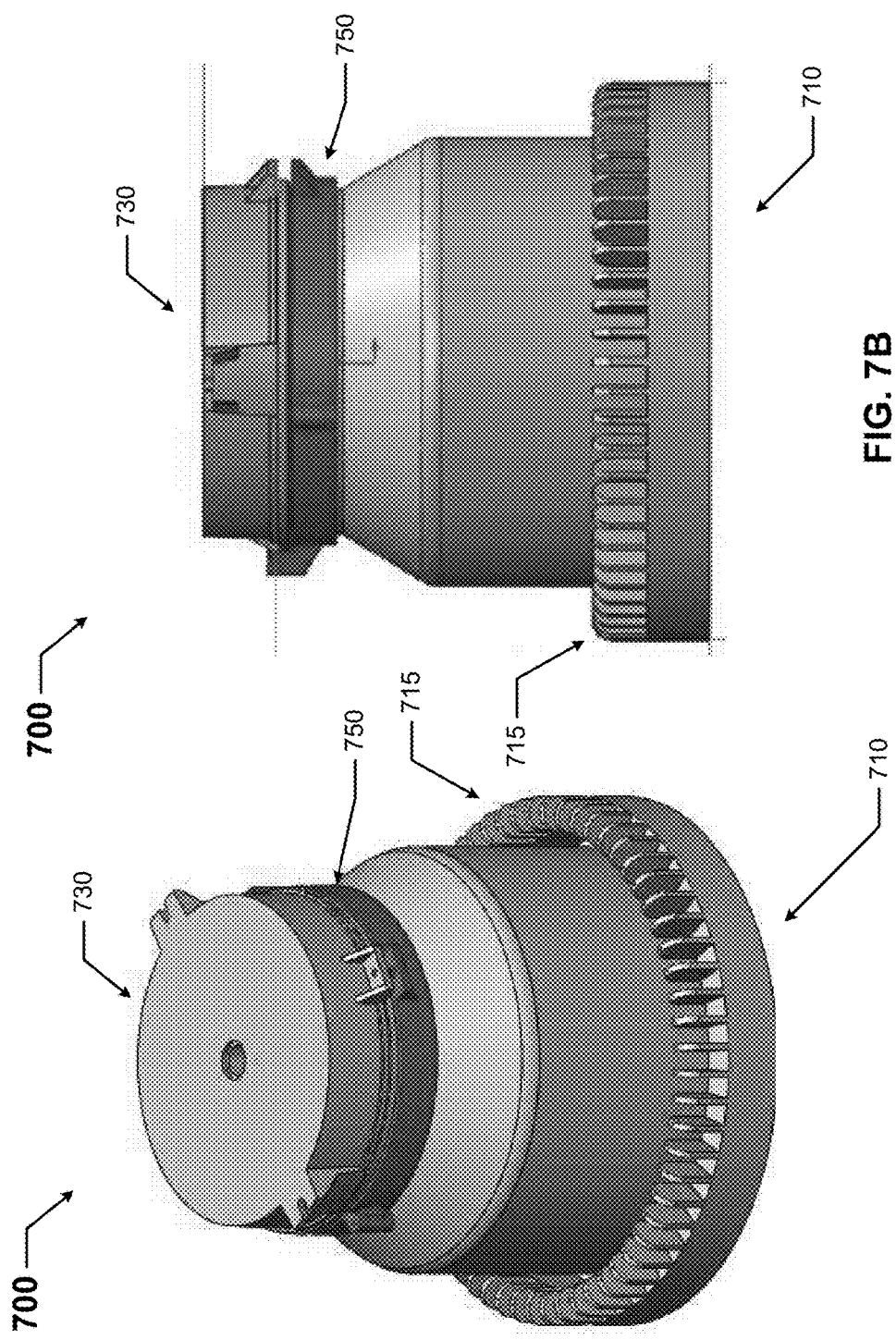
FIGS. 7A and 7B show still another light fixture in accordance with certain example embodiments.

FIGS. 7A and 7B show still another light fixture 700 in accordance with certain example embodiments. Specifically, FIG. 7A shows a front-side-top view of the light fixture 700 with the cover 730 closed, and FIG. 7B shows a side view of the light fixture 700 with the cover 730 open. Referring to FIGS. 1A-7B, the light fixture 700 of FIGS. 7A and 7B is substantially the same as the light fixtures discussed above, except as described below. For example, the housing 710 of the light fixture 700 of FIGS. 7A and 7B has a circular cross sectional shape when viewed from above and includes heat sink fins 715 that have a very low profile. Further, the collar 750 is disposed around the housing 710 and is hingedly coupled to the cover 730, which is configured substantially the same as the cover 130 of FIGS. 1A-4F above. Thus, the example shown in FIGS. 7A and 7B conveys again that example collars described herein can be used with housings having varying configurations.

Example embodiments can allow for more reliable and efficient light fixtures, particularly when those light fixtures are located in hazardous environments. Example embodiments, allow for repositioning housings of light fixtures when the cover of the housing is coupled to a structure. Example embodiments can also allow for inspection, maintenance, and repair of components disposed within a housing of a light fixture without having to remove the light fixture from the structure to which the light fixture is attached. As a result, example embodiments can help ensure efficient allocation of maintenance resources within a facility. Example embodiments can further provide a user with options to prolong the useful life of a light fixture or components thereof.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A light fixture, comprising:
a housing comprising at least one wall that forms a cavity, wherein a top end of the at least one wall comprises a collar limiting feature; and
a collar disposed around the at least one wall of the housing, wherein the collar abuts against the collar limiting feature,
wherein the housing is freely rotatable relative to the collar while the collar is disposed around the at least one wall of the housing and retained by the collar limiting feature.

2. The light fixture of claim 1, wherein the collar provides a compressive force against the housing relative to the cover when the cover and the collar are in the fully-closed position, wherein the compressive force creates a seal between the housing and the cover.

3. The light fixture of claim 2, wherein the housing, the collar, and the cover are located in a hazardous environment, wherein the compressive force is sufficient to meet applicable standards for the hazardous environment.

4. The light fixture of claim 2, wherein the top of the wall of the housing further comprises a channel disposed above the collar limiting feature, wherein a bottom side of the cover is disposed within the channel when the cover and the collar are in the fully-closed position.

5. The light fixture of claim 1, wherein the cover further comprises at least one structure coupling feature that is configured to fixedly couple to a structure.

6. The light fixture of claim 1, wherein the cover further comprises a second collar coupling feature, wherein the collar further comprises a second cover coupling feature, and wherein the second collar coupling feature of the cover couples to the second cover coupling feature of the collar.

7. The light fixture of claim 6, wherein the first collar coupling feature and the first cover coupling feature of the collar, when coupled to each other, form a hinge, and wherein the second collar coupling feature of the cover and the second cover coupling feature of the collar, when coupled to each other along with the first collar coupling feature and the first cover coupling feature being coupled to each other, prevent the cover from opening relative to the housing and keep the cover and the collar in the fully-closed position.

8. The light fixture of claim 7, wherein the first cover coupling feature of the collar is disposed at a substantially opposing end of the collar as the second cover coupling feature of the collar.

9. The light fixture of claim 7, further comprising:
a plurality of electrical components disposed within the cavity of the housing, wherein the plurality of components is accessible to a user when the second collar coupling feature of the cover and the second cover coupling feature of the collar are decoupled from each other and when the cover is subsequently opened relative to the housing using the hinge.

10. The light fixture of claim 9, wherein the cover is opened relative to the housing when the cover is coupled to at least one structure and when the cover and the collar are not in the fully-closed position is at least partially decoupled from the collar.

11. The light fixture of claim 1, wherein the collar, when viewed from above, is circular.

12. The light fixture of claim 1, wherein the collar further comprises a first rotational limiting feature, wherein the housing further comprises a second rotational limiting feature, and wherein the first rotational limiting feature and the second rotational limiting feature engage to limit a range of rotation of the housing relative to the collar.

13. The light fixture of claim 1, further comprising:
a cover moveably coupled to the collar, wherein the cover comprises a first collar coupling feature, wherein the first collar coupling feature couples to a first cover coupling feature of the collar, wherein the cover and the collar have a fully-closed position with respect to each other, wherein the housing is freely rotatable relative to the collar and the cover when the cover and the collar are not in the fully-closed position while the collar is disposed around the at least one wall of the housing.

14. The light fixture of claim 13, wherein the housing is held in a fixed position relative to the collar and the cover when the cover and the collar are in the fully-closed position while the collar is disposed around the at least one wall of the housing and is retained by the collar limiting feature of the housing.

15. A collar for a light fixture, the collar comprising:
a body having a top surface, an inner surface, and a shape formed by the inner surface, wherein the shape is substantially the same as a shape of an outer surface of a housing of the light fixture adjacent to a collar limiting feature of the light fixture; and
wherein the body is configured to allow the housing of the light fixture to freely rotate with respect to the body when the body is disposed around the outer surface of the housing of the light fixture and when the body is retained by the collar limiting feature of the light fixture.

16. The collar of claim 15, further comprising:
a first cover coupling feature disposed at a first location on the body, wherein the first cover coupling feature is configured to moveably couple to a first collar coupling feature of a cover of the light fixture,
wherein the body is further configured to prevent the housing of the light fixture from rotating relative to the body when the first cover coupling feature is coupled to the first collar coupling feature of the cover in a fully-closed position with respect to each other, wherein the body is further configured to allow the housing of the light fixture to freely rotate relative to the body when the first cover coupling feature and the first collar coupling feature, when coupled to each other, are not in the fully-closed position.

17. The collar of claim 16, further comprising:
a second cover coupling feature disposed at a second location on the body, wherein the second cover coupling feature is configured to couple to a second collar coupling feature of the cover of the light fixture.

18. The collar of claim 17, wherein the body further comprises a first portion and a second portion, and wherein the first portion comprises a sleeve that is configured to be disposed against a collar limiting feature disposed at a top end of a housing of the light fixture, wherein the second portion comprises a ring disposed over the first portion, wherein the first cover coupling feature and the second cover coupling feature are disposed on the ring, wherein the sleeve and the ring freely rotate with respect to each other in the absence of a collar coupling feature that fixes a position of the sleeve and the ring relative to each other.

19. The collar of claim 15, wherein the body further comprises a first portion and a second portion coupled to each other, wherein the first portion comprises a first coupling feature and a second coupling feature, wherein the second portion comprises a third coupling feature and a fourth coupling feature, wherein the first coupling feature of the first portion is coupled to the third coupling feature of the second portion, and wherein the second coupling feature of the first portion is coupled to the fourth coupling feature of the second portion.

20. The collar of claim 15, wherein the first cover coupling feature forms part of a hinge.

* * * * *